United States Patent
Kitazawa et al.

(10) Patent No.: US 8,111,652 B2
(45) Date of Patent: Feb. 7, 2012

(54) BASE STATION, RADIO COMMUNICATION SYSTEM, AND COMMUNICATION METHOD

(75) Inventors: Daisuke Kitazawa, Kawasaki (JP); Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 934 days.

(21) Appl. No.: 10/685,495

(22) Filed: Oct. 16, 2003

(65) Prior Publication Data

US 2004/0082364 A1    Apr. 29, 2004

(30) Foreign Application Priority Data

Oct. 17, 2002    (JP) .................................. 2002-303464

(51) Int. Cl.
H04W 4/00 (2009.01)
(52) U.S. Cl. ......................................... 370/329; 370/229
(58) Field of Classification Search .................. None
See application file for complete search history.

(56) References Cited

U.S. PATENT DOCUMENTS

| | | | |
|---|---|---|---|
| 6,173,331 B1 * | 1/2001 | Shimonishi .................. 709/232 |
| 6,577,596 B1 * | 6/2003 | Olsson et al. ................ 370/230 |
| 6,747,968 B1 * | 6/2004 | Seppala et al. ............... 370/338 |
| 6,807,426 B2 * | 10/2004 | Pankaj ......................... 455/453 |
| 6,917,588 B1 * | 7/2005 | Cao et al. ................... 370/230.1 |
| 6,937,566 B1 * | 8/2005 | Forslow ....................... 370/231 |
| 7,010,305 B2 * | 3/2006 | Immonen et al. .......... 455/452.2 |
| 7,209,437 B1 * | 4/2007 | Hodgkinson et al. ........ 370/230 |
| 7,233,602 B2 * | 6/2007 | Chen et al. ................... 370/445 |
| 2002/0032788 A1 * | 3/2002 | Emanuel et al. .............. 709/230 |
| 2002/0068588 A1 * | 6/2002 | Yoshida et al. ............... 455/461 |
| 2003/0139178 A1 * | 7/2003 | Uesugi et al. ................ 455/422 |
| 2003/0198204 A1 * | 10/2003 | Taneja et al. ................. 370/332 |
| 2004/0022191 A1 * | 2/2004 | Bernet et al. ................. 370/230 |
| 2005/0185651 A1 * | 8/2005 | Rinne ........................ 370/395.1 |
| 2006/0109829 A1 * | 5/2006 | O'Neill ........................ 370/338 |
| 2006/0126547 A1 * | 6/2006 | Puuskari et al. ............. 370/310 |

FOREIGN PATENT DOCUMENTS

| | | |
|---|---|---|
| EP | 1 130 872 A1 | 9/2001 |
| EP | 1 179 924 A2 | 2/2002 |
| EP | 1 179 927 A2 | 2/2002 |
| EP | 1 204 248 A1 | 5/2002 |
| EP | 1 296 475 A1 | 3/2003 |
| JP | 9-238142 | 9/1997 |
| JP | 2000-224231 | 8/2000 |
| JP | 2002-124985 | 4/2002 |

(Continued)

OTHER PUBLICATIONS

Patent Abstracts of Japan, JP 2001-308925, Nov. 2, 2001.

*Primary Examiner* — Kevin C Harper
*Assistant Examiner* — Rhonda Murphy
(74) *Attorney, Agent, or Firm* — Oblon, Spivak, McClelland, Maier & Neustadt, L.L.P.

(57) ABSTRACT

A base station comprises a packet classification unit configured to classify packets received/transmitted from/to a plurality of mobile stations into a quantitative guarantee type packet having a request value for communication quality or a relative guarantee type packet not having the request value, and a transmission order controller configured to control a transmission order of the packets for every classified quantitative guarantee type packet and every classified relative guarantee type packet.

19 Claims, 14 Drawing Sheets

FOREIGN PATENT DOCUMENTS

| | | |
|---|---|---|
| JP | 2002-271366 | 9/2002 |
| JP | 2002-281545 | 9/2002 |
| KR | 2002-0029127 | 4/2002 |
| KR | 2002-0048640 | 6/2002 |
| WO | WO 01/19028 A2 | 3/2001 |
| WO | WO 02/30056 A2 | 4/2002 |
| WO | WO 02/41589 A1 | 5/2002 |
| WO | WO 02/075994 A1 | 9/2002 |

* cited by examiner

FIG.2

| TRAFFIC TYPE | DSCP | PRIORITY | REAL TIME QUALITY (EXAMPLE) |
|---|---|---|---|
| EF (EXPEDITED FORWARDING) | 101110 | TOP PRIORITY | REAL TIME (SOUND) |
| AF (ASSURED FORWARDING) | XXXYY0 | NEXT PRIORITY FOLLOWING EF | AF4 : REAL TIME (MOVING IMAGE) AF1-3 : NOT REAL TIME |
| BE (BEST EFFORT) | 000000 | DOES NOT SUPPORT DIFFSERV COMMON TO ROUTER | NOT REAL TIME |

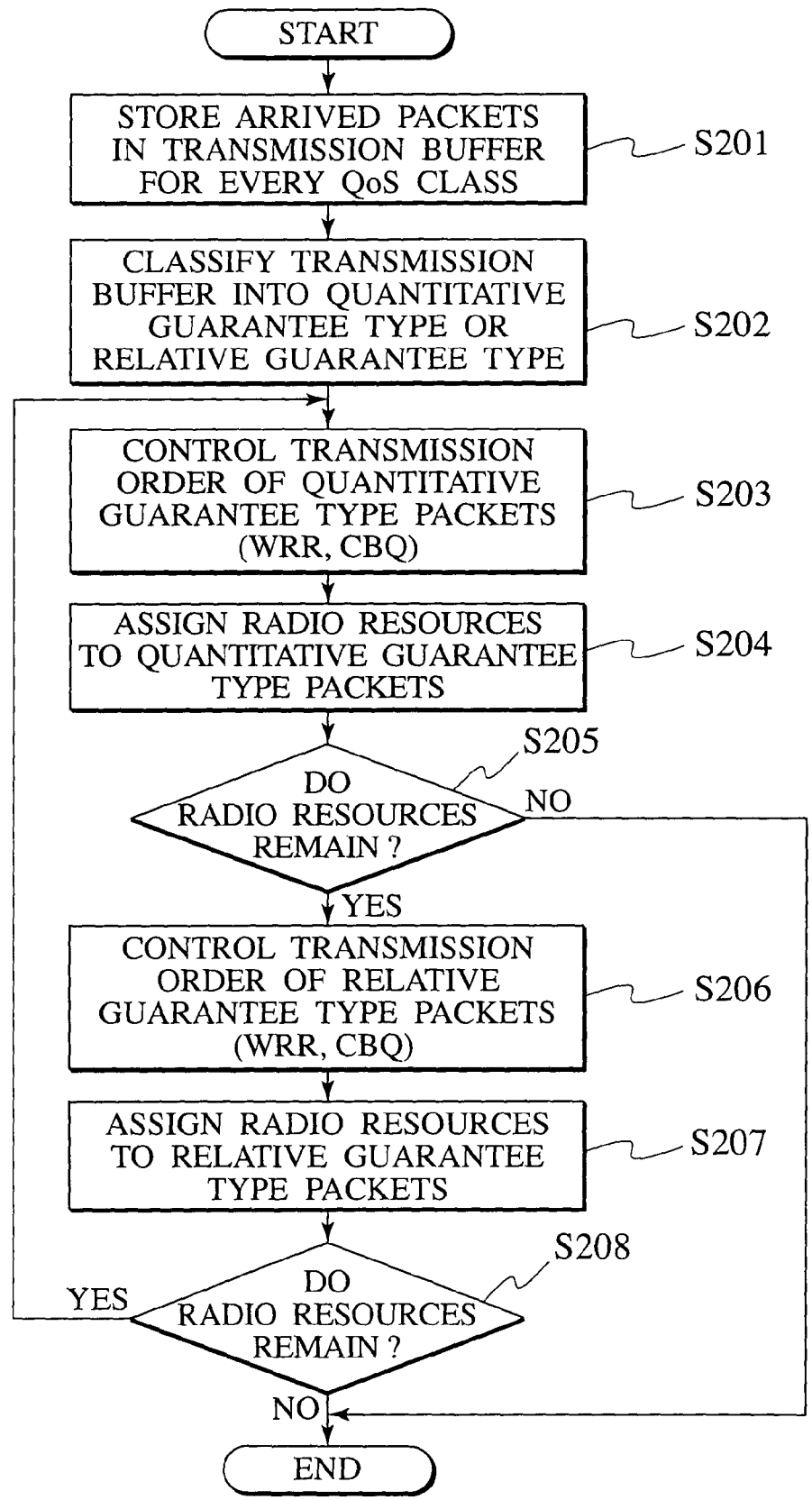

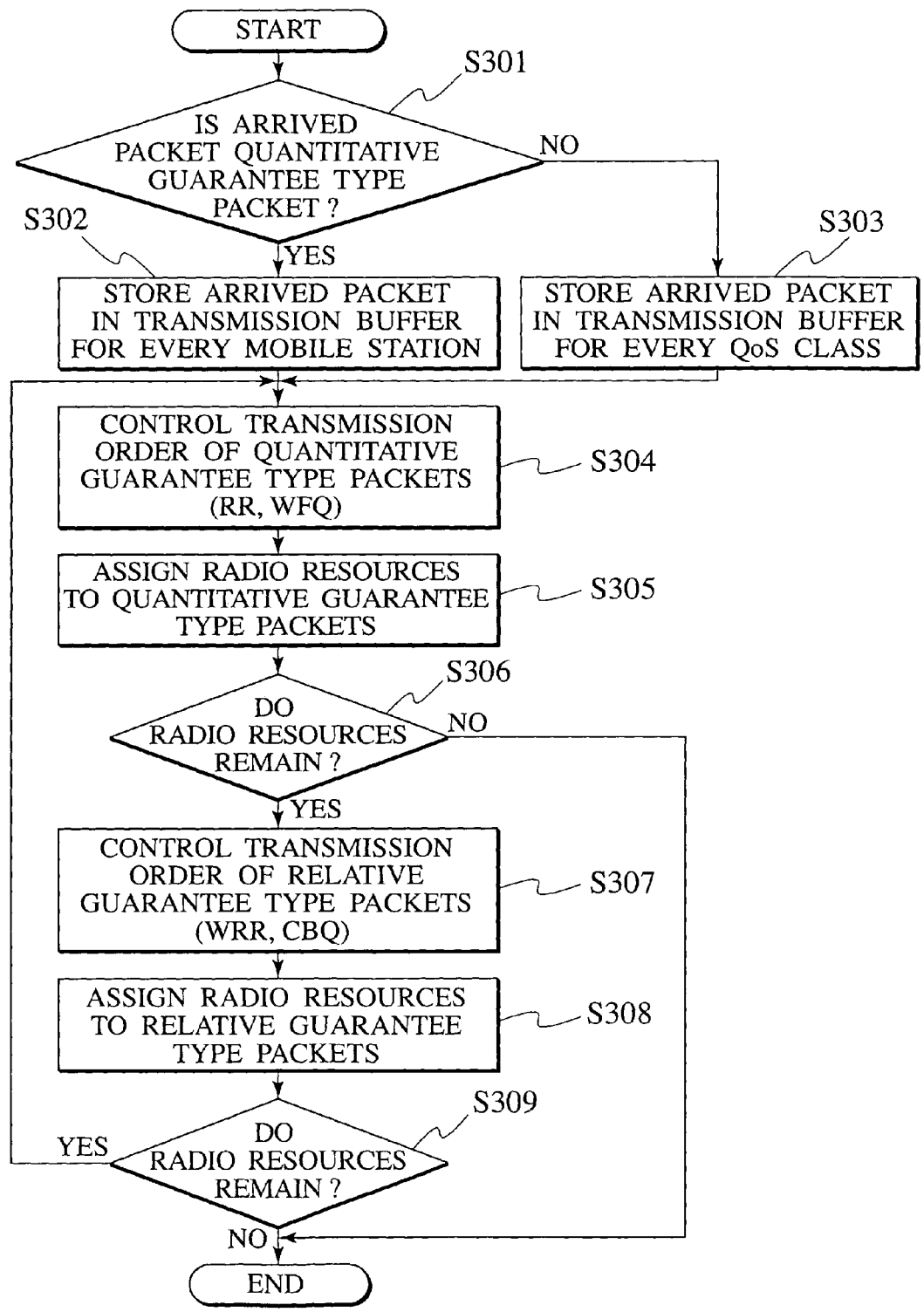

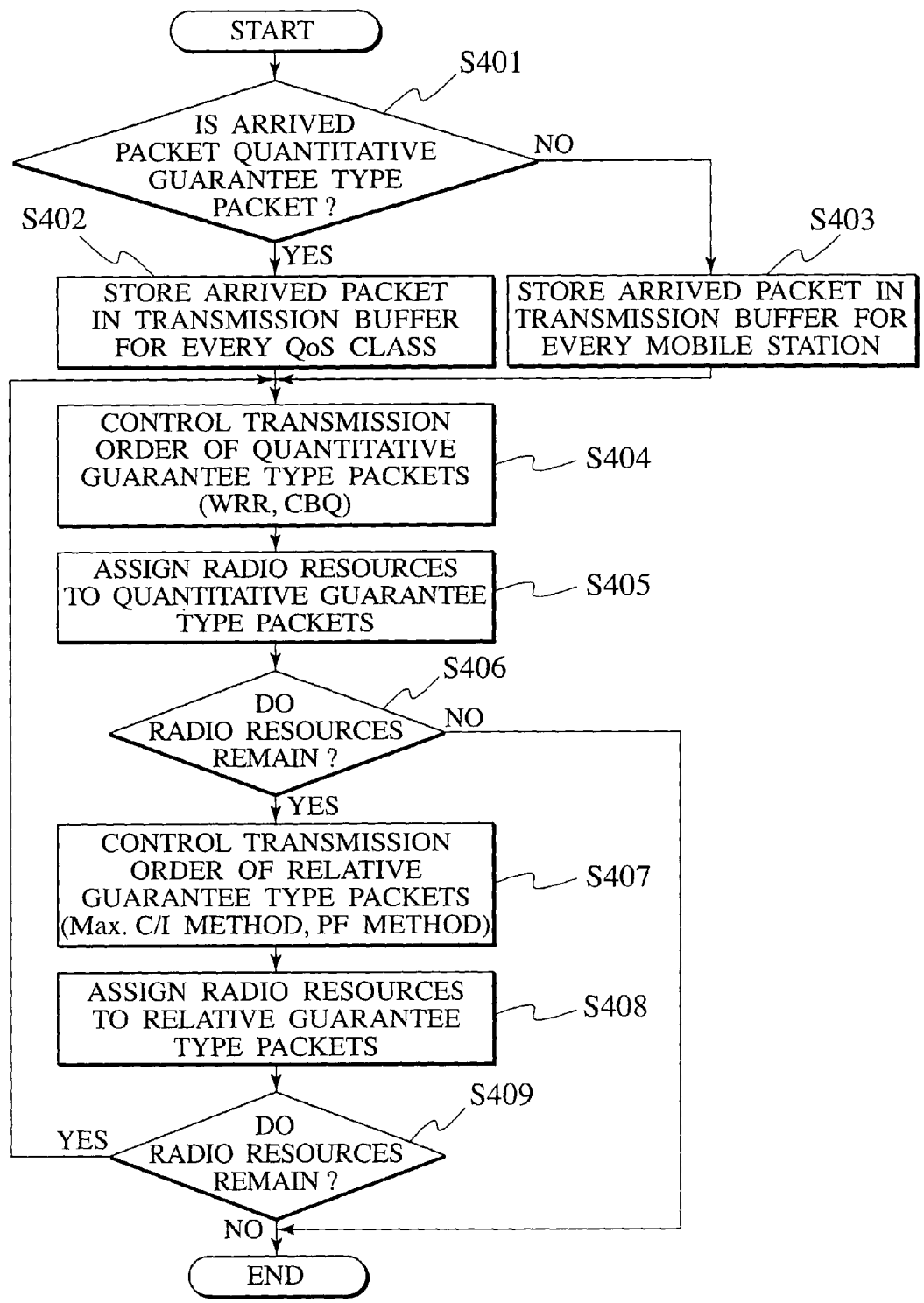

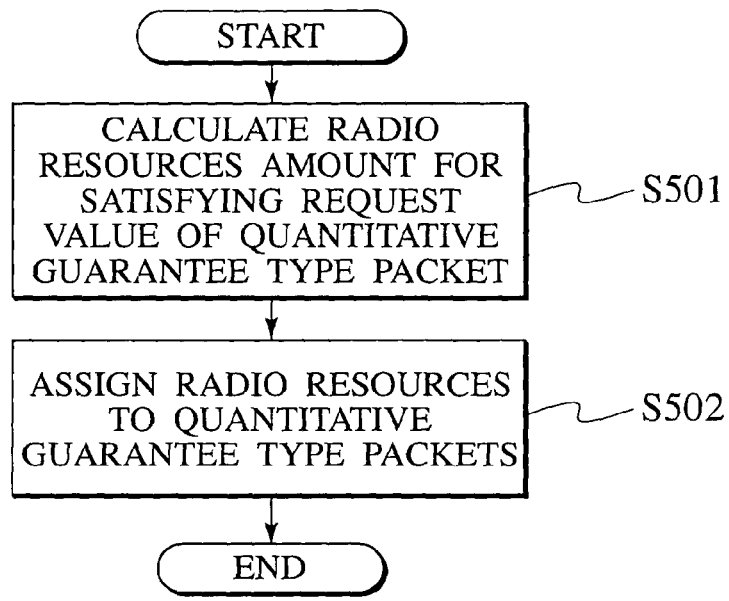
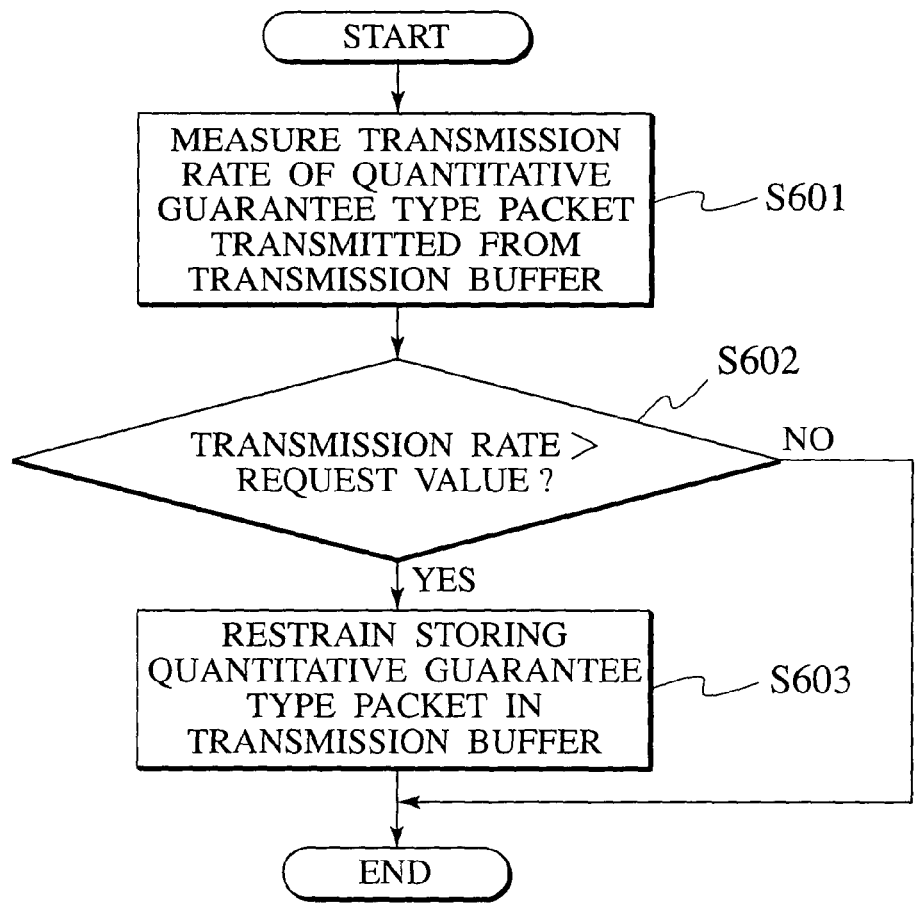

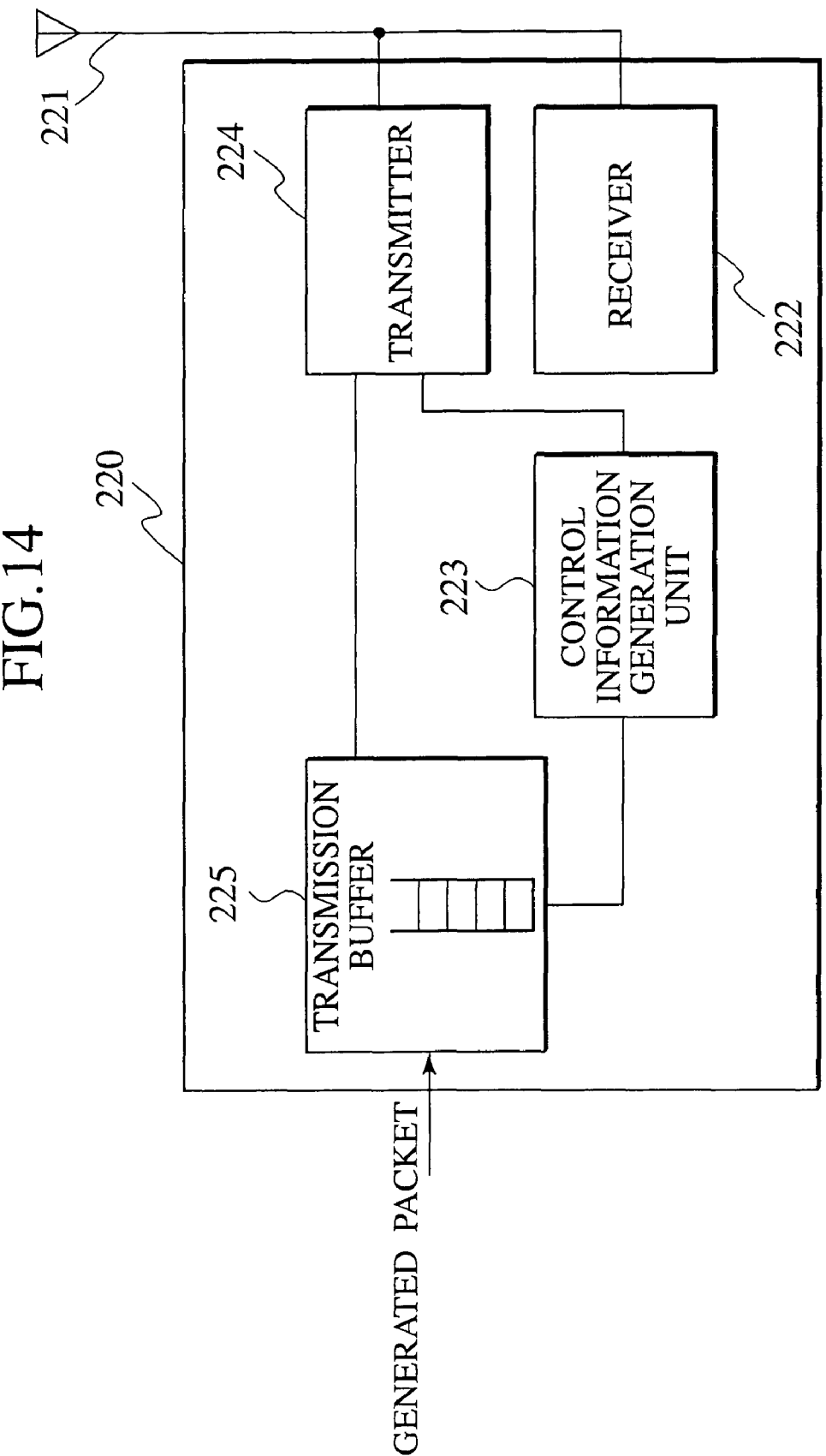

FIG.15

| | CONVERSATIONAL CLASS | STREAMING CLASS | INTERACTIVE CLASS | BACKGROUND CLASS |
|---|---|---|---|---|
| CHARACTERISTICS | · TWO-WAY COMMUNICATION SUCH AS SOUND<br>· REAL TIME | · STREAMING WITH LITTLE DELAY IN SINGLE-WAY<br>· REAL TIME | · REPLY WITHIN SPECIFIED PERIOD<br>· LOW ERROR RATE<br>· NOT REAL TIME | · NO REQUESTS FOR DELAY<br>· LOW ERROR RATE<br>· NOT REAL TIME |
| EXAMPLES | · VoIP<br>· VIDEO CONFERENCE | · REAL TIME VIDEO STREAMING | · Web VIEWING<br>· DATA BASE ACCESS | · ELECTRONIC MAIL<br>· FILE TRANSFER |
| REQUIREMENTS FOR QoS | · MINIMUM DELAY<br>· LITTLE JITTER | · LITTLE DELAY<br>· LITTLE JITTER | · LIMITED DELAY VALUE<br>· LOW BER | · LOW BER |

BASE STATION, RADIO COMMUNICATION SYSTEM, AND COMMUNICATION METHOD

CROSS REFERENCE TO RELATED APPLICATIONS

This application is based upon and claims the benefit of priority from the prior Japanese Patent Application No. P2002-303464, filed on Oct. 17, 2002; the entire contents of which are incorporated herein by reference.

BACKGROUND OF THE INVENTION

1. Field of the Invention

The present invention relates to a base station, a radio communication system, and a communication method.

2. Description of the Related Art

There has been recent demand for radio communication systems with multimedia services. It has been thought that suitable control with consideration for a different Quality of Service (hereafter, referred to as 'QoS') for each application will be indispensable in the future. The requirements for traffic characteristics and networks specified by the QoS differ according to the type of application. As a result, in order to satisfy the requirements for QoS of each application used by mobile stations, it has been thought that constructing networks and control technologies with consideration for the QoS are essential.

Furthermore, it has been thought that Internet protocol (IP) may be used as the protocol for all routes between a transmission side and a reception side, in future network systems. As a result, there is a high possibility that radio communication systems conventionally constructed by using their own networks may be converted to IP-based systems. Packet communication is fundamental to IP-based systems.

Therefore, it is necessary for the radio communication systems to control for QoS in packet communication. In this case, reception quality in a mobile station always varies according to interference caused by variation of Propagation path environment or other signals, in the radio communication systems. As a result, special consideration, which is different from that for wired communication systems, is required. From such background, various control technologies regarding QoS in the radio communication systems have been proposed. In addition, methods of scheduling to determine transmission order with consideration for fairness among mobile stations not requesting any QoS have been proposed.

For example, as a control technology for an environment where mobile stations not requesting any QoS and mobile stations requesting QoS coexist, a method has been proposed for scheduling by classifying the mobile stations into mobile stations requesting QoS and mobile stations not requesting any QoS, and further classifying the mobile stations requesting QoS into a QoS critical group requiring a high level of QoS and a QoS non-critical group requiring a low level of QoS (e.g., Synopsis of Institute of Electronics, Information, and Communication Engineers Society Convention 2002, 'All-IP MOBILE NETWORK ARCHITECTURE PROPOSAL (5), QoS GUARANTEE PACKET SCHEDULER FOR BASE STATION' written by Ono et al., Institute of Electronics, Information, and Communication Engineers, p. 408, September 2002). With this method, the transmission order is controlled such that packets transmitted to the mobile stations in the QoS critical group and packets transmitted to the mobile stations having actual values for QoS, which are lower than the request value, are given higher priorities.

However, conventionally proposed control technologies have not controlled with consideration for the case where various mobile stations, such as mobile stations not requesting any predetermined QoS or any specific Request values for communication quality, mobile stations requesting only predetermined QoS, and mobile stations requesting specific request values for communication quality, coexist within the radio communication system. Accordingly, packet transmission between the base station and a plurality of mobile stations has not been appropriately controlled. As a result, appropriate services have not been provided for all mobile stations. For example, there are cases where the request value for communication quality in a certain mobile station have not been satisfied, utilization efficiency of radio resources has been lowered due to assignment of excess radio resources to a mobile station requesting a certain class of QoS, or communication quality of a certain mobile station has extremely degraded. These are problems when the radio communication systems provide a certain quality of service. The scheduling methods described in the above-mentioned literature could not sufficiently guarantee QoS.

Furthermore, since the present Internet is an open network that communicates using TCP/IP, various packets are transferred from multiple hosts on the network. Accordingly, it is assumed that the method of handling various packets will become a very important problem when the radio communication systems are converted to IP-based systems in the future.

BRIEF SUMMARY OF THE INVENTION

An object of the present invention is to appropriately control packet transmission when various mobile stations coexist in a radio communication system.

A radio communication system of the present invention comprises a plurality of mobile stations, and a base station configured to receive/transmit a packet from/to the plurality of mobile stations. The base station of the present invention comprises a packet classification unit configured to classify packets received/transmitted from/to a plurality of mobile stations into a quantitative guarantee type packet having a request value for communication quality or a relative guarantee type packet not having the request value; and a transmission order controller configured to control a transmission order of the packets for every classified quantitative guarantee type packet and every classified relative guarantee type packet.

According to the radio communication system and base station, the packet classification unit classifies packets into either a packet having a request value for communication quality (hereafter, referred to as 'quantitative guarantee type packet') or a packet not having the request value for communication quality (hereafter, referred to as 'relative guarantee type packet'). The transmission order controller controls a transmission order of the packets for every classified quantitative guarantee type packet and every relative guarantee type packet. Therefore, when various mobile stations, such as a mobile station not requesting any predetermined QoS or any specific request values for communication quality, a mobile station requesting only predetermined QoS, and a mobile station requesting specific request values for communication quality, coexist in the radio communication system, the base station can appropriately control packet transmission to the plurality of mobile stations. As a result, the base stations can provide appropriate services for all mobile stations.

A communication method of the present invention comprises classifying packets received/transmitted from/to a plurality of mobile stations into a quantitative guarantee type packet having a request value for communication quality or a relative guarantee type packet not having the request value by a base station; and controlling a transmission order of the packets for every classified quantitative guarantee type packet and every classified relative guarantee type packet by the base station.

BRIEF DESCRIPTION OF THE SEVERAL VIEWS OF THE DRAWINGS

FIG. 2 is a diagram illustrating QoS classes according to the embodiment of the present invention;

FIG. 7 is a flowchart illustrating a procedure for a communication method when transmission buffers are divided by QoS classes according to the embodiment of the present invention;

FIG. 8 is a flowchart illustrating a procedure for a communication method when transmission buffers are divided by mobile stations for quantitative guarantee type packets, and divided by QoS classes for relative guarantee type packets according to the embodiment of the present invention;

FIG. 9 is a flowchart illustrating a procedure for a communication method when transmission buffers are divided by QoS classes for the quantitative guarantee type packets, and divided by mobile stations for relative guarantee type packets according to the embodiment of the present invention;

FIG. 10 is a flowchart illustrating a procedure for a radio resource assigning method according to the embodiment of the present invention;

FIG. 12 is a flowchart illustrating a procedure for a transfer speed control method according to a modified example of the present invention;

FIG. 14 is a block diagram illustrating a configuration of a mobile station according to the modified example of the present invention; and FIG. 15 is a diagram illustrating QoS classes according to the modified example of the present invention.

DETAILED DESCRIPTION OF THE INVENTION

[Communication System]

Figure 1:
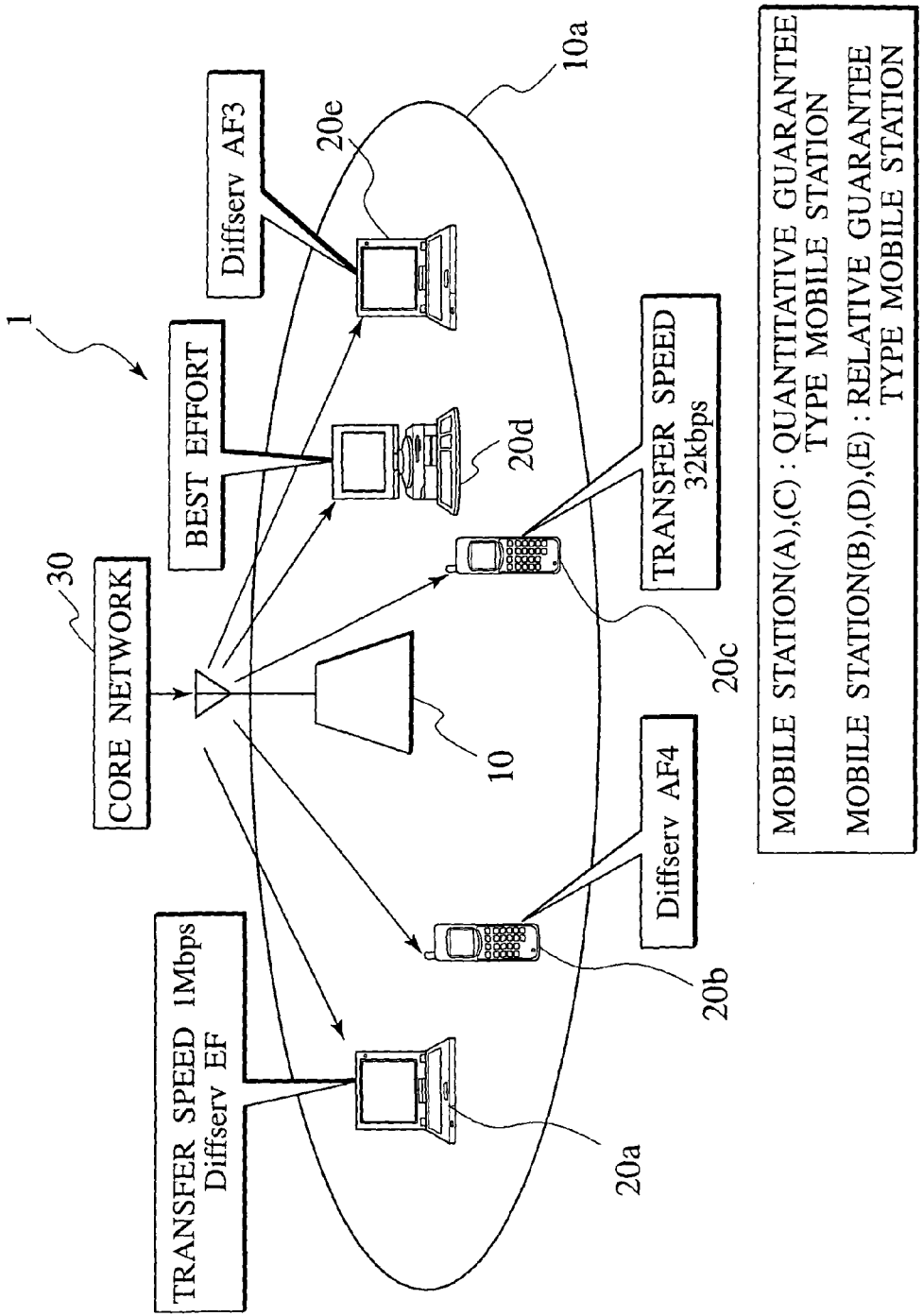
FIG. 1 is a diagram illustrating a radio communication system according to an embodiment of the present invention.

As shown in FIG. 1, a radio communication system 1 comprises a base station 10, a plurality of mobile stations (A) 20a through (E) 20e, and a core network 30. The radio communication system 1 adopts a cellular system. The core network 30 adopts Differentiated Service (Diffserv) as a QoS control method. Diffserv is a method, which each node provides identifiers shown in FIG. 2 called Diffserv code points (DSCPs) for identifying QoS classes to packets, and each node transfers the packets or performs scheduling for transmission based on the DSCP provided to each packet.

Note that in the core network 30, other QoS control method, such as Integrated Service (Intserv), may be used. Intserv is a method, which each node reserves resources according to the requirements for communication quality by using a resource reservation protocol (RSVP). The QoS classes specified in Intserv include Guaranteed Service (GS), Controlled Load (CL), and Best Effort (BE). In addition, between each node, requesting request values for communication quality, or providing the qualities corresponding to the request values is possible.

The former Diffserv has an advantage that the process speed can be improved, and it can be used in large-scale networks. Meanwhile, Diffserv roughly guarantees quality by QoS class unit. On the other hand, the latter Intserv has an advantage that qualities corresponding to the requirements for communication quality may be provided between each node. Meanwhile, with Intserv., the communication quality between the transmission side and the reception side may be degraded according to process delay due to resource reservation in each node, if the network is extensive. As a result, the QoS control methods may be used properly according to the requirement of the mobile station, in the core network 30; for example, Diffserv is used for a mobile station that requests a service according to QoS class, and Intserv is used for a node that requests a request value for communication quality.

A plurality of mobile stations (A) 20a through (E) 20e use various applications, respectively. The mobile stations (A) 20a through (E) 20e request different Requirements for QoS or requirements for communication quality. The mobile station (A) 20a has a request value for communication quality such as 'the average transfer speed should be 1 Mbps or greater'. In addition, since a packet transmitted to the mobile station (A) 20a in the core network 30 is classified as 'class EF' specified in Diffserv shown in FIG. 2, '101110' is provided as the DSCP. The mobile station (C) 20c also has a request value for communication quality such as 'the average transfer speed should be 32 kbps or greater'. As described above, the mobile stations (A) 20a and (C) 20c are mobile stations having a request value for communication quality (hereafter, referred to as 'quantitative guarantee type mobile station'). Note that the request values for communication quality other than the transfer speed, for example, transfer delay, or jitter may be specified. For example, a mobile station may have a request value for communication quality such as 'the maximum acceptable delay should be 100 msec or less'.

The mobile stations (B) 20b and (E) 20e request QoS corresponding to Internet QoS, namely, they request the QoS class specified in Diffserv. The mobile station (B) 20b requests 'class AF4' specified in Diffserv shown in FIG. 2. The mobile station (E) 20e requests 'class AF3' specified in Diffserv shown in FIG. 2. In addition, the mobile station (D) 20d is a best effort class mobile station that does not request any QoS classes or any request values for communication quality. As described above, the mobile stations (B) 20b, (E) 20e, and (D) 20d are mobile stations not having the request value for communication quality (hereafter, referred to as 'relative guarantee type mobile station').

As described above, various mobile stations, such as the mobile station (D) 20d not requesting any predetermined QoS or any specific request values for communication quality, the mobile stations (B) 20b and (E) 20e requesting only predetermined QoS, and the mobile stations (A) 20a and (C) 20c requesting the specific request value for communication quality, coexist within a cell 10a covered by the base station 10. A network provider sets and provides a QoS and communication quality corresponded to the QoS for every application; alternatively, a certain mobile station requests the base station 10 to provide a necessary QoS for running each application used by that mobile station, and a network provider provides a certain communication quality according to the requested QoS to that mobile station. By contracting a Service Level Agreement (SLA) with the network provider, mobile station users may be provided a quality depending on the SLA from the network provider.

Figure 3:
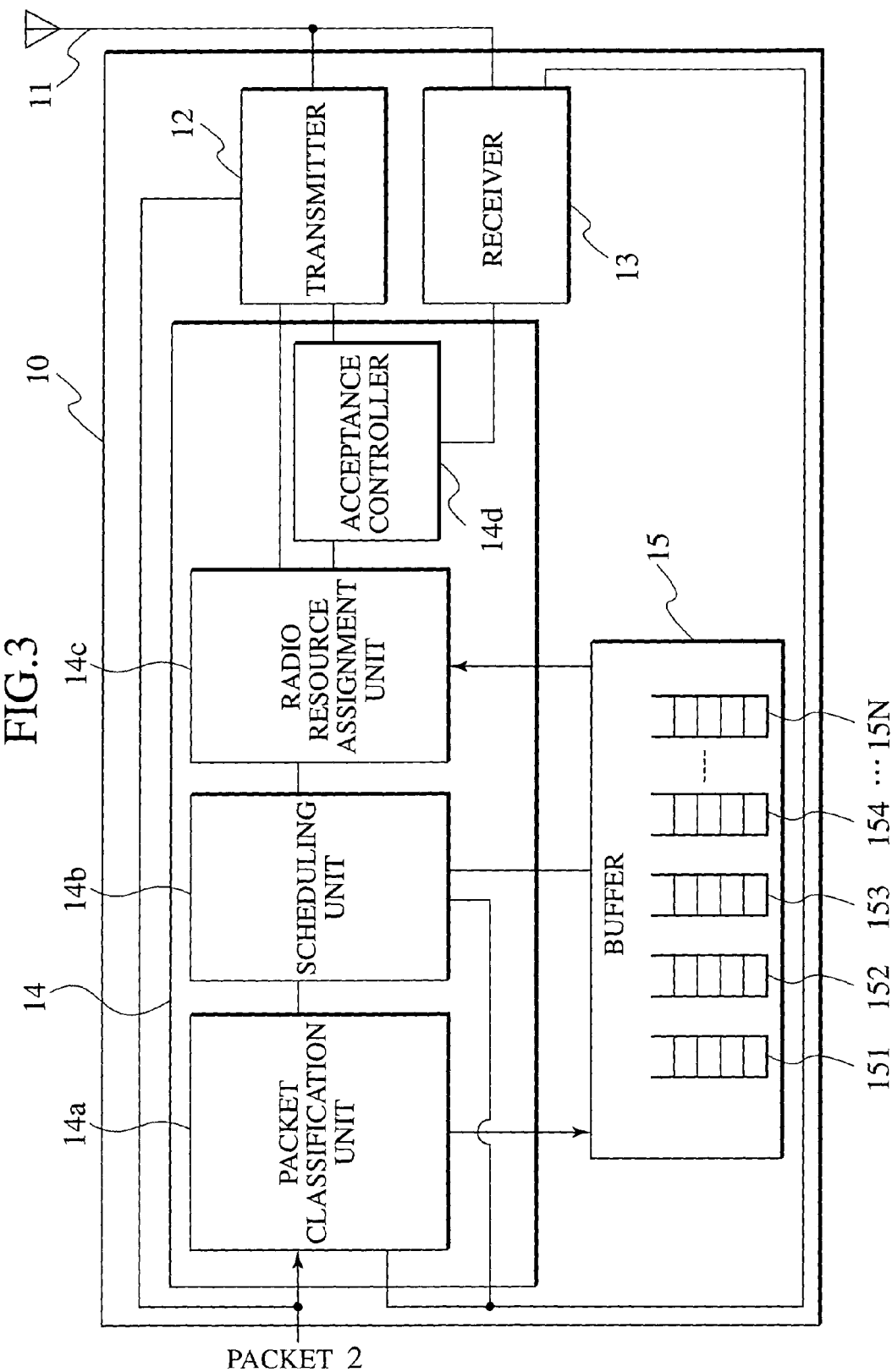
FIG. 3 is a block diagram illustrating a configuration of a base station according to the embodiment of the present invention.
Figure 4:
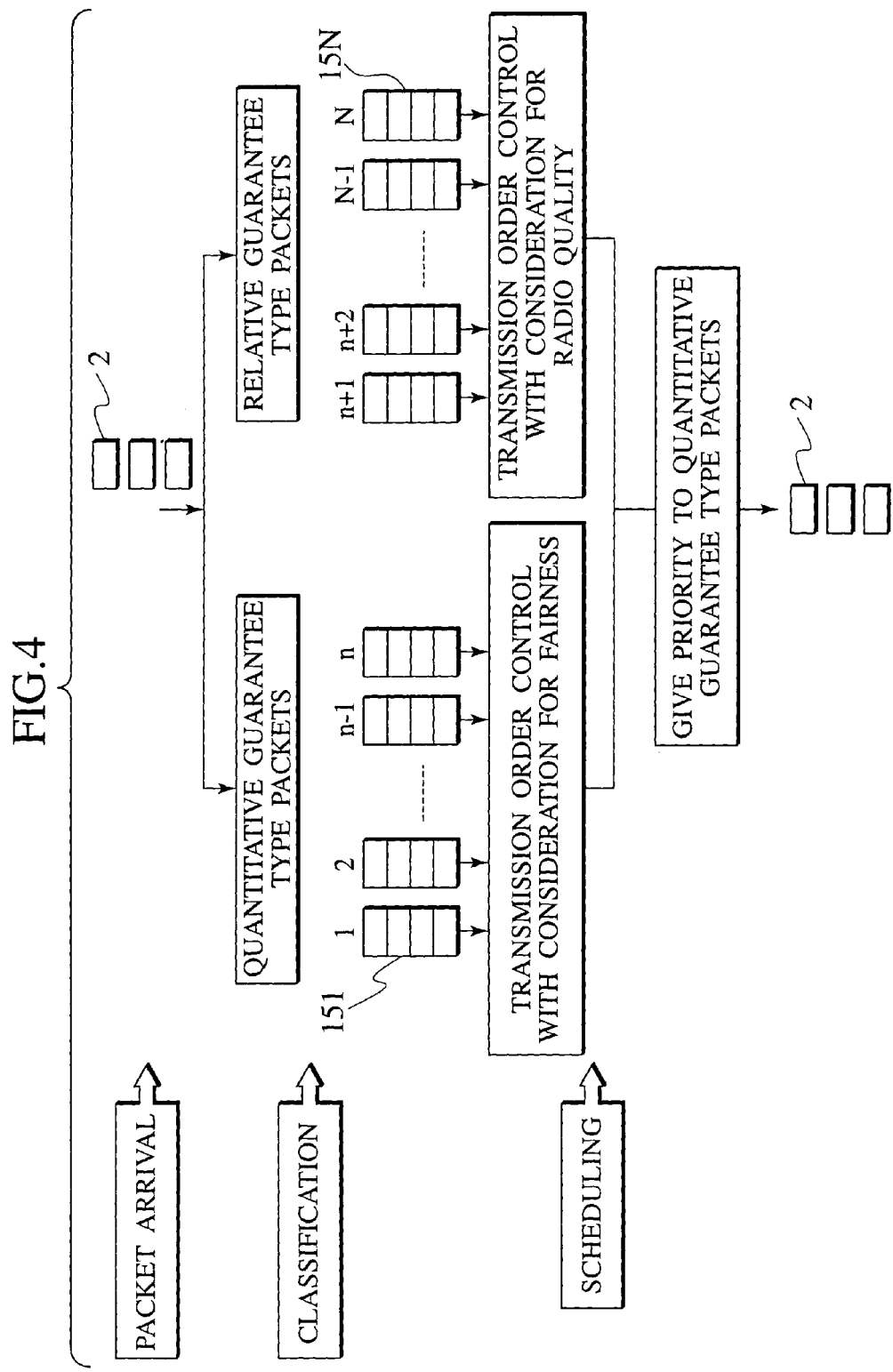
FIG. 4 is a diagram illustrating a process from packet arrival to scheduling according to the embodiment of the present invention.

The base station 10 receives/transmits a packet from/to a plurality of mobile stations (A) 20a through (E) 20e existing within the cell 10a. FIG. 3 illustrates a configuration of the base station 10, and FIG. 4 illustrates a process from packet arrival to scheduling performed by the base station 10. In addition, FIGS. 3 and 4 show the case where the base station 10 transmits a packet to a plurality of mobile stations (A) 20a through (E) 20e via the downlink. As shown in FIG. 3, the base station 10 comprises an antenna 11, a transmitter 12, a receiver 13, a control device 14, and a buffer 15. The control device 14 controls the base station 10. The control device 14 comprises a packet classification unit 14a, a scheduling unit 14b, a radio resource assignment unit 14c, and an acceptance controller 14d.

The transmitter 12 transmits a packet to the mobile stations (A) 20a through (E) 20e via the antenna 11. The transmitter 12 transmits a packet assigned radio resources input from the radio resource assignment unit 14c. In addition, when a packet transmitted from the core network 30 to the mobile stations (A) 20a through (E) 20e arrives at the base station 10, the transmitter 12 notifies the mobile stations (A) 20a through (E) 20e that packets with destinations, which are the mobile stations (A) 20a through (E) 20e have arrived. The transmitter 12 also transmits to a mobile station a reply in response to an acceptance request from the mobile station, and input from the acceptance controller 14d.

The receiver 13 receives control information from the mobile stations (A) 20a through (E) 20e via the antenna 11. When receiving packets with destinations, which are the mobile stations (A) 20a through (E) 20e, from the base station 10, the mobile stations (A) 20a through (E) 20e transmit to the base station 10 control information, such as information regarding the QoS and communication quality (hereafter, referred to as 'QoS information') or information used by the base station 10 for determining a transmission order of the packet (hereafter, referred to as 'scheduling information'). Therefore, the receiver 13 receives the control information such as QoS information or scheduling information transmitted from the respective mobile stations (A) 20a through (E) 20e. The receiver 13 inputs the control information received from the respective mobile stations (A) 20a through (E) 20e to the packet classification unit 14a and the scheduling unit 14b. The receiver 13 also receives a new connection request from a mobile station. The receiver 13 inputs the received connection request to the acceptance controller 14d.

The buffer 15 is a packet storage unit configured to store packets. As shown in FIG. 3, the buffer 15 has a plurality of transmission buffers 151 through 15N. A plurality of transmission buffers 151 through 15N may be divided by mobile station (A) 20a through (E) 20e or by QoS classes. When the transmission buffers 151 through 15N are divided by mobile station (A) 20a through (E) 20e, the respective transmission buffers 151 through 15N store packets transmitted to the respective mobile stations (A) 20a through (E) 20e. On the other hand, when the transmission buffers 151 through 15N are divided by QoS classes, the respective transmission buffers 151 through 15N store a packet belonging to the respective QoS classes. Furthermore, each of the transmission buffers 151 through 15N is, as shown in FIG. 4, classified into either transmission buffers No. 1 through No. n for quantitative guarantee type packets that store quantitative guarantee type packets or transmission buffers No. n+1 through No. N for relative guarantee type packets that store relative guarantee type packets.

The packet classification unit 14a classifies packets into either a quantitative guarantee type packet having a request value for communication quality or a relative guarantee type packet not having a request value. As shown in FIGS. 3 and 4, when packets 2 transmitted to the mobile stations (A) 20a through (E) 20e from the core network 30 arrive at the base station 10, the packet classification unit 14a classifies an arrived packet into either a quantitative guarantee type packet or a relative guarantee type packet and stores it in a corresponding transmission buffer 151 through 15N. At this time, the packet classification unit 14a can classify and store packets in a corresponding transmission buffer as described below. After the packet classification unit 14a stores each packet in a corresponding transmission buffer for every mobile station or for every QoS class, the packet classification unit 14a classifies each transmission buffer into either a transmission buffer in which quantitative guarantee type packets have been stored or a transmission buffer in which relative guarantee type packets have been stored. Alternatively, the packet classification unit 14a may classify and store each packet in a corresponding transmission buffer by storing each arrived packet in a corresponding transmission buffer for every mobile station or for every QoS class, while classifying each packet as either a quantitative guarantee type packet or a relative guarantee type packet.

More specifically, the packet classification unit 14a classifies a packet based on the QoS information from the mobile stations (A) 20a through (E) 20e input from the receiver 13 or based on QoS information attached to the packet, and stores it in a corresponding transmission buffer 151 through 15N for every mobile station (A) 20a through (E) 20e or for every QoS class. For example, the packet classification unit 14a classifies a packet with a destination, which is a quantitative guarantee type mobile station that has transmitted a request value for communication quality as QoS information into a quantitative guarantee type packet, and stores it in a corresponding transmission buffer No. 1 through No. n for storing quantitative guarantee type packets. Moreover, the packet classification unit 14a classifies a packet with a destination, which is a relative guarantee type mobile station that has not requested any request values for communication quality but has transmitted QoS class information such as DSCP into a relative guarantee type packet, and stores it in transmission buffer No. n+1 through No. N for storing relative guarantee type packets, and for a corresponding QoS class.

Moreover, when a packet to which a QoS control method such as Diffserv has been applied at the core network 30 and which has a header with QoS information such as DSCP arrives, the packet classification unit 14a may classify and store the packet in transmission buffer for a corresponding QoS class, based on the QoS information such as DSCP attached to the packet. Note that when the arrived packet does not have QoS information and there is no QoS information from the mobile station, the packet classification unit 14a may classify the packet as a relative guarantee type packet, and store it in transmission buffer for the best effort class.

In the case of the radio communication system 1 shown in FIG. 1, the packet classification unit 14*a* classifies packets with destinations, which are the mobile stations (A) 20*a* and (C) 20*c* into quantitative guarantee type packets, and stores them in a corresponding transmission buffer No. 1 through No. n for storing quantitative guarantee type packets shown in FIG. 4. In addition, the packet classification unit 14*a* classifies packets with destinations, which are the mobile stations (B) 20*b*, (D) 20*d*, and (E) 20*e*, into relative guarantee type packets, and stores them in a corresponding transmission buffer No. n+1 through No. N for storing relative guarantee type packets shown in FIG. 4.

The scheduling unit 14*b* is a transmission order controller that performs scheduling, that is, controls a transmission order of the packet for every classified quantitative guarantee type packet and every classified relative guarantee type packet. The scheduling unit 14*b* controls the transmission order of the classified packets stored in the buffer 15. As shown in FIG. 4, to begin with, the scheduling unit 14*b* gives priority to a quantitative guarantee type packet over a relative guarantee type packet in a transmission order, that is, the quantitative guarantee type packets are given higher priority. In other words, the scheduling unit 14*b* determines that quantitative guarantee type packets come before relative guarantee type packets in the transmission order. In determining the transmission order, the scheduling unit 14*b* determines the transmission order such that the quantitative guarantee type packets existing in the buffer 15 are transmitted prior to the relative guarantee type packets.

The scheduling unit 14*b* then controls the transmission order of the quantitative guarantee type packets. The scheduling unit 14*b* controls the transmission order of the quantitative guarantee type packets so as to guarantee the request values for communication quality. Furthermore, the scheduling unit 14*b* preferably controls the transmission order of the quantitative guarantee type packets, as shown in FIG. 4, with consideration for fairness among the mobile stations (A) 20*a* through (E) 20*e* or fairness among the QoS classes. Accordingly, the fairness among the mobile stations or QoS classes may be maintained.

When considering the fairness among the mobile stations, for example, the scheduling unit 14*b* controls the transmission order such that the qualities for mobile stations with the same QoS class can be the same. In addition, the scheduling unit 14*b* controls the transmission order so as to prevent a difference in transmission opportunities among the mobile stations from increasing. When considering the fairness among the QoS classes, the scheduling unit 14*b* controls the transmission order so as to keep a specific difference in quality among the mobile stations with different QoS classes. In this manner, the scheduling unit 14*b* controls the transmission order based on the QoS class. Note that when the transmission buffers are divided by mobile stations, the scheduling unit 14*b* preferably controls the transmission order of the quantitative guarantee type packets with consideration for fairness among the mobile stations. Otherwise, when the transmission buffers are divided by QoS classes, the scheduling unit 14*b* preferably controls the transmission order of the quantitative guarantee type packets with consideration for fairness among the QoS classes.

More specifically, the scheduling unit 14*b*, for example, applies a transmission order determination method such as Round Robin (RR) or Weighted Fair Queuing (WFQ) so as to guarantee the request values for communication quality, and controls the transmission order of the quantitative guarantee type packets with consideration for fairness among the mobile stations (A) 20*a* through (E) 20*e*. RR is a method of assigning radio resources according to the predetermined order for every mobile station. WFQ is a method of giving each transmission buffer a weight factor, which is used to determine a suitable amount of radio resources assigned for every transmission buffer, and distributing the total amount of radio resources, which are assignable by the base station 10, to each transmission buffer according to given weight factors.

In this case, the scheduling unit 14*b* preferably controls the transmission order of a plurality of quantitative guarantee type packets having the same request value for communication quality such as transfer speed or transmission delay, such that the communication quality for the requested request value becomes the same, among a plurality of mobile stations receiving/transmitting the quantitative guarantee type packets having the same request value. Accordingly, since the base station 10 is capable of providing the same communication quality for all of the multiple mobile stations that request the same request value, maintaining fairness among the mobile stations is possible.

In addition, the scheduling unit 14*b* applies a transmission order determination method such as Weighted Round Robin (WRR) or Class-Based Queuing (CBQ) so as to guarantee the request values for communication quality, and controls the transmission order of the quantitative guarantee type packets with consideration for fairness among the QoS classes. WRR is a method of determining the final order by giving a weight factor of each QoS class to a predetermined order using the RR method, which assigns radio resources for every mobile station according to the predetermined order. Note that the scheduling unit 14*b* may use scheduling information from the mobile stations (A) 20*a* through (E) 20*e* input from the receiver 13, as scheduling information such as weight factors used for WFQ and WRR methods and predetermined orders used for RR and WRR methods.

In addition, the scheduling unit 14*b* controls the transmission order of the quantitative guarantee type packets so as to guarantee the request values for communication quality using the following method, for example. When the requested request value is, for example, transfer speed, the scheduling unit 14*b* controls the transmission order such that the number of quantitative guarantee type packets transmitted in a unit time becomes equal to the number of packets satisfying the request value for the transfer speed. More specifically, a case where a quantitative guarantee type packet has a request value for communication quality such as 'the average transfer speed should be R (kbps) or greater' is described below.

The period for controlling transmission order is given as '$\Delta T$ (msec)'. The number of quantitative guarantee type packets taken out from the transmission buffer storing quantitative guarantee type packets with the above-mentioned request value, and then transmitted in a unit time$\Delta T$ is given as 'n'. The size of the packet is given as 'k (bits)'. In this case, the request value is satisfied when the following Expression (1) is satisfied. Expression (2) is obtained by modifying Expression (1). Accordingly, the number of packets 'n' satisfying Expression (2) is the number of packets that satisfies the request value.

$$nk/(\Delta T \times 10^{-3}) \geq R \times 10^3 \tag{1}$$

$$n \geq R\Delta T/k \tag{2}$$

The scheduling unit 14*b* controls the transmission order using this Expression (2). To begin with, the scheduling unit 14*b* calculates a minimum natural number 'n' that satisfies Expression (2). The scheduling unit 14*b* determines the calculated minimum natural number 'n', which satisfies Expression (2), as the number of packets taken out and transmitted when controlling the transmission order. The scheduling unit 14*b* then uses the determined number of packets 'n' as the weight factor when applying the transmission order determination method such as WFQ or WRR using the weight factor.

As a result, the scheduling unit 14*b* may control the transmission order such that the number of quantitative guarantee type packets can be equal to the number of packets satisfying the request values. Therefore, the base station 10 can guarantee the request values for communication quality of quantitative guarantee type packets. In addition, the minimum natural number 'n' satisfying Expression (2) is determined as the number of packets taken out and transmitted when controlling the transmission order. Accordingly, the base station 10 may prevent the quantitative guarantee type packet from being transmitted at an average transfer speed that greatly exceeds the request value, and may prevent excessive radio resources from being used for quantitative guarantee type packet transmission. As a result, the base station 10 may use the radio resources more effectively, and may reserve the radio resources assigned to relative guarantee type packets.

If radio resources remain after the transmission order of the quantitative guarantee type packets has been controlled in this manner, the scheduling unit 14*b* then controls the transmission order of the relative guarantee type packets. Meanwhile, if all radio resources have been used upon determination of the transmission order of the quantitative guarantee type packets, the scheduling unit 14*b* ends controlling the transmission order at this time. Note that the scheduling unit 14*b* receives notification of the amount of remaining radio resources from the radio resource assignment unit 14*c*, when the radio resource assignment unit 14*c* has assigned radio resources to quantitative guarantee type packets. Therefore, the scheduling unit 14*b* determines whether radio resources remain, based on the notification from the radio resource assignment unit 14*c*.

The scheduling unit 14*b* preferably controls the transmission order of the relative guarantee type packets based on the radio quality between the base station 10 and a plurality of mobile stations (A) 20*a* through (E) 20*e* as shown in FIG. 4. Since the relative guarantee type packet dose not have request value for communication quality, strict control for guaranteeing a request value for communication quality is not necessary. Accordingly, the scheduling unit 14*b* may effectively utilize the limited radio resources by controlling the transmission order based on the radio quality. The scheduling unit 14*b* may use the transfer quality of the radio channel between the base station 10 and the respective mobile stations (A) 20*a* through (E) 20*e* as radio quality. The scheduling unit 14*b* may use reception quality such as a Bit Error Rate (BER) or a Signal to Interference power Ratio (SIR), or a data reception failure rate, as radio quality.

Furthermore, the scheduling unit 14*b* also preferably controls the transmission order of the relative guarantee type packets with consideration for fairness among the QoS classes, as in the case of the quantitative guarantee type packets. In this manner, the scheduling unit 14*b* controls the transmission order based on the QoS class. In addition, the scheduling unit 14*b* preferably controls the transmission order, based on the radio quality between each of the mobile stations in the same QoS class and the base station, or preferably controls the transmission order for the mobile stations in different QoS classes, with consideration for fairness among the QoS classes. In addition, when a plurality of transmission buffers are divided by mobile stations, the scheduling unit 14*b* preferably controls the transmission order of the relative guarantee type packets, based on the radio quality between the base station and each mobile station. On the other hand, when a plurality of transmission buffers are divided by QoS classes, the scheduling unit 14*b* preferably controls the transmission order of the relative guarantee type packets, with consideration for fairness among the QoS classes.

More specifically, the scheduling unit 14*b* controls the transmission order of relative guarantee type packets, based on the radio quality between the base station and each of the mobile stations (A) 20*a* through (E) 20*e*, using a transmission order determination method such as a Max. C/I method or a Proportional Fairness (PF) method. The Max. C/I method is a method of assigning all radio resources, which are assignable by the base station 10, to the mobile station with the best reception quality when determining the transmission order. Accordingly, the radio resource usage efficiency can be greatly improved. The PF method is a method of assigning radio resources to a mobile station having the maximum ratio between the measured value of the instantaneous transfer speed at the time of determining the transmission order and the measured value of the average transfer speed for a specified period. Accordingly, the radio resource usage efficiency slightly decreases compared with the Max. C/I method, however, it can increase the opportunities that radio resources are assigned to a mobile station having poor reception quality, and improve the fairness of transmission opportunities among the mobile stations than with the Max. C/I method.

Moreover, the scheduling unit 14*b* controls the transmission order of the relative guarantee type packets using a transmission order determination method such as WRR or CBQ with consideration for fairness among the QoS classes. Note that the scheduling unit 14*b* may use scheduling information from the mobile stations (A) 20*a* through (E) 20*e* input from the receiver 13, as scheduling information such as the reception quality including SIR used for the Max. C/I method, and the weight factor and predetermined transmission order used for WRR. In addition, when using the PF method, the scheduling unit 14*b* measures the instantaneous transfer speed at the time of determining the transmission order and the average transfer speed for a specified time period.

The scheduling unit 14*b* that has determined the transmission order of packets in this manner, inputs the determined transmission order of packets to the radio resource assignment unit 14*c*. In the case of the radio communication system 1 shown in FIG. 1, the scheduling unit 14*b* gives priority to quantitative guarantee type packets with destinations, which are the mobile stations (A) 20*a* and (C) 20*c* over relative guarantee type packets with transmission destinations, which are the mobile stations (B) 20*b*, (D) 20*d*, and (E) 20*e*, in the transmission order. The scheduling unit 14*b* then determines the transmission order of the quantitative guarantee type packets with destinations, which are the mobile stations (A) 20*a* and (C) 20*c*, and then determines the transmission order of the relative guarantee type packets with destinations, which are the mobile stations (B) 20*b*, (D) 20*d*, and (E) 20*e*.

The radio resource assignment unit 14*c* assigns radio resources for transmitting packets to the packets, according to the transmission order of the packets controlled by the scheduling unit 14*b*. The radio resource assignment unit 14*c* assigns the radio resources, according to the transmission order of the packets input from the scheduling unit 14*b*. Moreover, the radio resource assignment unit 14*c* takes out a packet from the buffer 15 and assigns the radio resources thereto. The radio resource assignment unit 14*c* then inputs the packet assigned the radio resources to the transmitter 12. In addition, the radio resource assignment unit 14*c* assigns, for example, a frequency band, transmission power, or a time slot as radio resources.

To begin with, the transmission order of the quantitative guarantee type packets is input to the radio resource assignment unit 14c from the scheduling unit 14b. The radio resource assignment unit 14c then assigns radio resources to quantitative guarantee type packets. The radio resource assignment unit 14c notifies the scheduling unit 14b of the amount of remaining radio resources upon assigning the radio resources to the quantitative guarantee type packets. As a result, when all radio resources have been used upon assigning the radio resources to the quantitative guarantee type packets, the radio resource assignment unit 14c notifies that radio resources do not remain, to the scheduling unit 14b.

If radio resources remain after the radio resource assignment unit 14c has assigned the radio resources to the quantitative guarantee type packets, the scheduling unit 14b determines the transmission order of the relative guarantee type packets. The transmission order of the relative guarantee type packet is then input to the radio resource assignment unit 14c. Accordingly, the radio resource assignment unit 14c assigns remaining radio resources to the relative guarantee type packets. Meanwhile, if radio resources do not remain, the scheduling unit 14b does not determine the transmission order of the relative guarantee type packets. Therefore, the transmission order of the relative guarantee type packets is not input to the radio resource assignment unit 14c. At this time, the radio resource assignment unit 14c ends the assignment of radio resources.

If radio resources remain after the radio resource assignment unit 14c has assigned radio resources to the quantitative guarantee type packets and relative guarantee type packets, the radio resource assignment unit 14c assigns the remaining radio resources to quantitative guarantee type packets existing in the buffer 15. Accordingly, the base station 10 may efficiently utilize the remaining radio resources without waste.

Moreover, the radio resource assignment unit 14c preferably assigns radio resources to quantitative guarantee type packets based on the request value for communication quality. More specifically, the radio resource assignment unit 14c calculates the minimum amount of radio resources required to satisfy the request value for the quantitative guarantee type packet. The radio resource assignment unit 14c then assigns the calculated minimum amount of radio resources to the quantitative guarantee type packet. Here, a case is described where a quantitative guarantee type packet has a request value for communication quality such as 'the average transfer speed should be R (kbps) or greater', and a time slot divided for every frame is assigned as a radio resource.

The transfer speed of a radio channel between the base station 10 and each mobile station is given as 'C (kbps)'. The number of all time slots within a single frame is given as 'l'. The number of time slots assigned to a quantitative guarantee type packet is given as 'm'. In this case, the request value is satisfied when the following Expression (3) is satisfied. Expression (4) is obtained by modifying Expression (3). Accordingly, the number of time slots 'm' satisfying Expression (4) is equal to the number of time slots that satisfies the request value.

$$(mC \times 10^3)/l \geq R \times 10^3 \quad (3)$$

$$m \geq lR/C \quad (4)$$

The radio resource assignment unit 14c calculates a minimum natural number 'm' that satisfies Expression (4). The radio resource assignment unit 14c may find the number of time slots 'm', which is the minimum amount of radio resources required to satisfy the request value for the quantitative guarantee type packet. The radio resource assignment unit 14c then assigns the calculated number of time slots 'm' to the quantitative guarantee type packet. Accordingly, the base station 10 may guarantee the request value for communication quality. In addition, the base station 10 assigns the minimum amount of radio resources required to satisfy the request value for the quantitative guarantee type packet, to the quantitative guarantee type packet. Accordingly, the base station 10 may prevent radio resources that greatly exceed the amount of radio resources required to satisfy the request value from being assigned to the quantitative guarantee type packet. As a result, the base station 10 can utilize the radio resources more effectively, and may reserve radio resources assigned to relative guarantee type packets.

In the case of the radio communication system 1 shown in FIG. 1, to begin with, the radio resource assignment unit 14c assigns radio resources to quantitative guarantee type packets with destinations, which are the mobile stations (A) 20a and (C) 20c. The radio resource assignment unit 14c then assigns radio resources to relative guarantee type packets with destinations, which are the mobile stations (B) 20b, (D) 20d, and (E) 20e.

The acceptance controller 14d controls the acceptance of a connection request from a mobile station, based on the amount of radio resources required by the mobile stations (A) 20a and (C) 20c, which receive/transmit quantitative guarantee type packets. The acceptance controller 14d obtains from the receiver 13 a new connection request from a mobile station. The acceptance controller 14d then inputs replies to the connection request from that mobile station to the transmitter 12. The acceptance controller 14d controls the acceptance of the connection request from that mobile station, such that the amount of radio resources required to receive/transmit the quantitative guarantee type packets from/to all quantitative guarantee type mobile stations connected to the base station 10 is less than the amount of all radio resources of the base station 10.

More specifically, the acceptance controller 14d finds the total amount by adding the amount of radio resources required to receive/transmit the quantitative guarantee type packets from/to the mobile stations (A) 20a and (C) 20e, which are already connected to the base station 10, to the amount of radio resources required to receive/transmit the quantitative guarantee type packet from/to the quantitative guarantee type mobile station that has requested a new connection with the base station 10. The acceptance controller 14d compares the total amount with the amount of all radio resources of base station 10.

When the total amount exceeds the amount of all radio resources of base station 10, the acceptance controller 14d then denies a new connection request from a quantitative guarantee type mobile station. Meanwhile, when the total amount is less than the amount of all radio resources of base station 10, the acceptance controller 14d accepts a new connection request from a quantitative guarantee type mobile station. Moreover, the acceptance controller 14d may accept a connection request from a relative guarantee type mobile station without determining the amount of resources. In addition, the acceptance controller 14d may control the acceptance, based on the amount of remaining radio resources of the base station 10 at that time. Accordingly, the base station 10 can control the amount of radio resources required by the quantitative guarantee type mobile stations connected to the base station 10, to make it less than the amount of all radio resources of the base station 10, and can thus guarantee the request value required for quantitative guarantee type packets.

Figure 5:
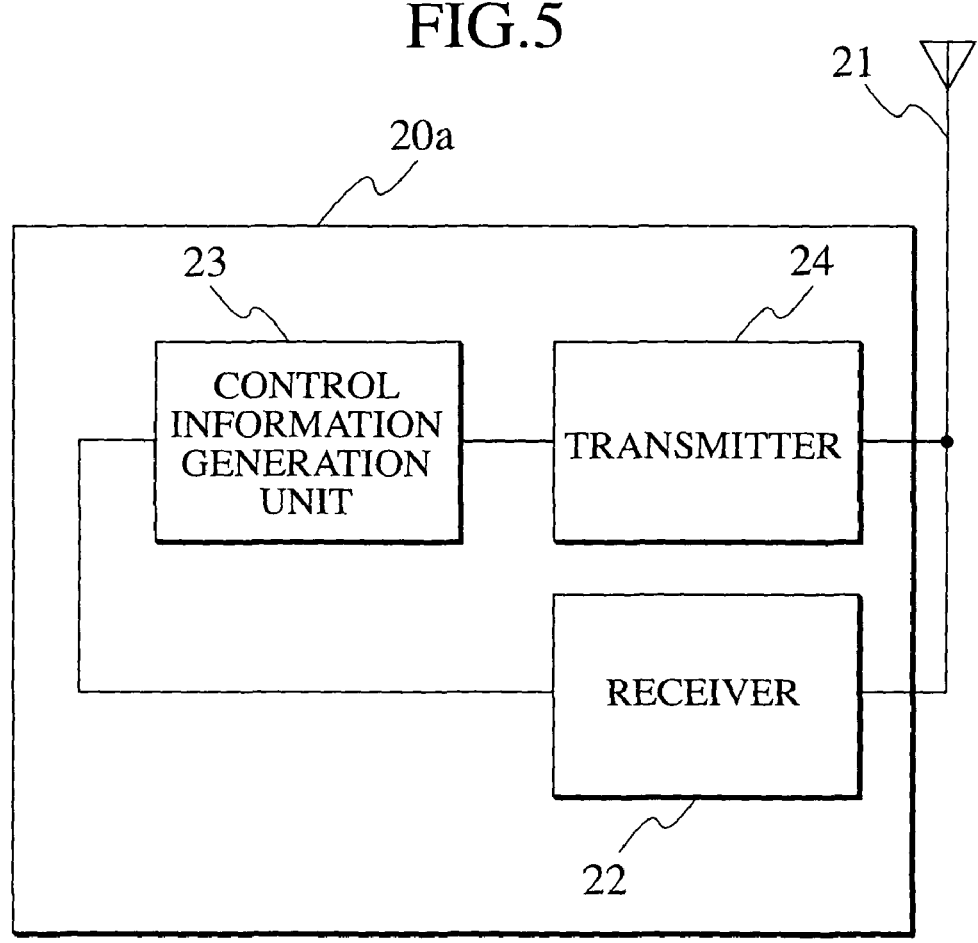
FIG. 5 is a block diagram illustrating a configuration of a mobile station according to the embodiment of the present invention.

FIG. 5 illustrates a configuration of the mobile station (A) 20a. Note that the mobile stations (B) 20d through (E) 20e have the same configuration. In FIG. 5, a case is illustrated where the mobile station (A) 20a receives a packet transmitted to the mobile station (A) 20a from the base station 10 through the downlink. The mobile station (A) 20a comprises an antenna 21, a receiver 22, a control information generation unit 23, and a transmitter 24. The receiver 22 receives a packet transmitted from the base station 10 via the antenna 21. In addition, the receiver 22 receives notification that a packet with a destination, which is the mobile station (A) 20a, has arrived at the base station 10, from the base station 10, via the antenna 21. The receiver 22 inputs the notification that the packet has arrived, to the control information generation unit 23. The receiver 22 also receives a reply to the connection request from the base station 10.

The control information generation unit 23 generates control information. The control information generation unit 23 generates control information such as QoS information and scheduling information. In the case of a quantitative guarantee type mobile station, the QoS information generated includes, for example, a request value for communication quality. On the other hand, in the case of a relative guarantee type mobile station, the QoS information generated includes, for example, information of the QoS class such as DSCP.

The scheduling information generated includes a weight factor used for the WFQ and WRR methods, a predetermined order used for the RR and WRR methods, and reception quality such as SIR used for the Max. C/I method. The control information generation unit 23 generates control information when notification of packet arrival has been input from the receiver 22. The control information generation unit 23 inputs the generated control information to the transmitter 24. The transmitter 24 transmits the control information to the base station 10 via the antenna 21. The transmitter 24 transmits the control information input from the control information generation unit 23 to the base station 10. The transmitter 24 also transmits a connection request to the base station 10.

[Communication Method]

Figure 6:
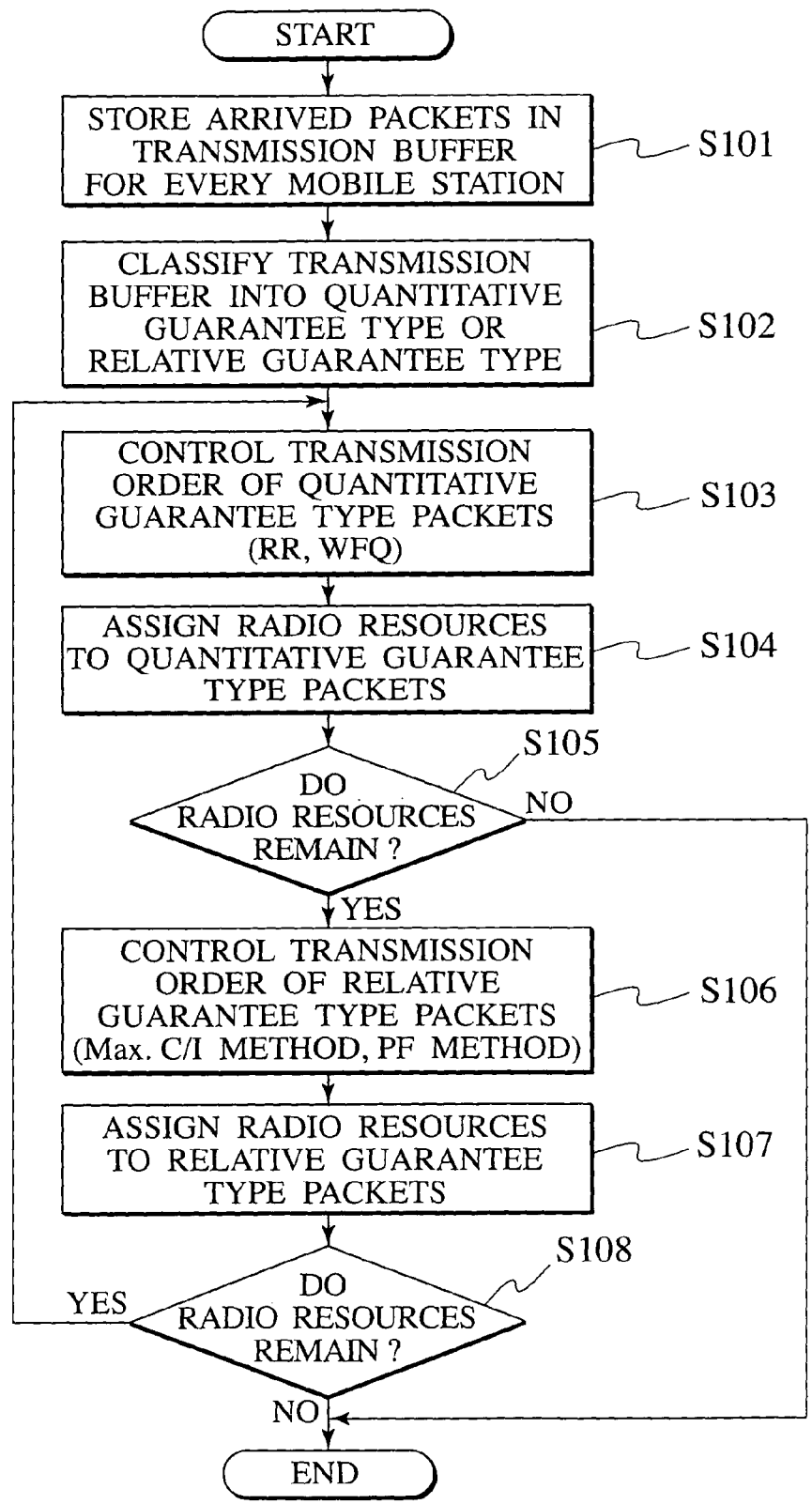
FIG. 6 is a flowchart illustrating a procedure for a communication method when transmission buffers are divided by mobile stations according to the embodiment of the present invention.

Next, a communication method using the above-mentioned radio communication system 1 is described. FIG. 6 illustrates a procedure for the communication method in the case where a plurality of transmission buffers 151 through 15N are divided by mobile station (A) 20a through (E) 20e existing within the cell 10a covered by the base station 10. To begin with, the base station 10 stores packets arrived at the base station 10 from the core network 30, in a corresponding transmission buffers 151 through 15N for every mobile station (A) 20a through (E) 20e, depending on the destination of that packet (S101). The base station 10 then classifies the transmission buffers 151 through 15N stored packets for the mobile stations (A) 20a through (E) 20e, into either a transmission buffer stored with quantitative guarantee type packets, or a transmission buffer stored with relative guarantee type packets (S102).

The base station 10 gives priority to quantitative guarantee type packets with destinations, which are the mobile stations (A) 20a and (C) 20c, over relative guarantee type packets with destinations, which are the mobile stations (B) 20b, (D) 20d, and (E) 20e, in the transmission. The base station 10 then controls the transmission order of the quantitative guarantee type packets with destinations, which are the mobile stations (A) 20a and (C) 20c, using RR and WFQ such that the request values for communication quality can be guaranteed (S103). If a plurality of transmission buffers 151 through 15N are divided by mobile stations as described above, the transmission order of the quantitative guarantee type packets is controlled with consideration for fairness among the mobile stations. The base station 10 assigns radio resources to quantitative guarantee type packets according to the transmission order controlled in step S103 (S104).

Following step S104, the base station 10 determines whether or not radio resources remain (S105), and ends controlling the transmission order when radio resources do not remain. Meanwhile, in step S105, if radio resources remain, the base station 10 controls the transmission order of the relative guarantee type packets with destinations, which are the mobile stations (B) 20b, (D) 20d, and (E) 20e, using the Max. C/I method or PF method (S106). If a plurality transmission buffers 151 through 15N are divided by mobile stations as described above, the transmission order of the relative guarantee type packets is controlled, based on the radio quality between each mobile station and the base station. The base station 10 assigns radio resources to relative guarantee type packets according to the transmission order controlled in step S106 (S107).

Following step S107, the base station 10 determines whether radio resources remain (S108), and ends controlling the transmission order when radio resources do not remain. Meanwhile, in step S108, if radio resources remain, the base station 10 returns to step S103 and assigns remaining radio resources to quantitative guarantee type packets existing within the buffer 15. In this manner, an amount of radio resources more than the amount assigned in step S104 may be assigned to quantitative guarantee type packets.

FIG. 7 illustrates a procedure for the communication method for the case where all mobile stations (A) 20a through (E) 20e existing within the cell 10a covered by the base station 10 are classified for every QoS class, the base station 10 has as many transmission buffers 151 through 15N as the number of QoS classes, and a plurality of transmission buffers 151 through 15N are classified for every QoS class.

To begin with, the base station 10 stores packets arrived at the base station 10 from the core network 30, in a corresponding transmission buffer 151 through 15N for every QoS class according to the class of packets (S201). The base station 10 then classifies the transmission buffers 151 through 15N stored with packets for every QoS class, into either a transmission buffer stored with quantitative guarantee type packets or a transmission buffer stored with relative guarantee type packets (S202).

The base station 10 gives priority to quantitative guarantee type packets with destinations, which are the mobile stations (A) 20a and (C) 20c, over the relative guarantee type packets with destinations, which are the mobile stations (B) 20b, (D) 20d, and (E) 20e, in the transmission order. The base station 10 then controls the transmission order of the quantitative guarantee type packets with destinations, which are the mobile stations (A) 20a and (C) 20c, using WRR and CBQ such that a request value for communication quality can be guaranteed (S203). If a plurality of transmission buffers 151 through 15N are divided by QoS classes as described above, the transmission order of the quantitative guarantee type packets is controlled with consideration for fairness among the QoS classes. Steps S204 and S205 are the same as steps S104 and S105 shown in FIG. 6.

In step S205, radio resources remain, the base station 10 controls the transmission order of the relative guarantee type packets with destinations, which are the mobile stations (B) 20b, (D) 20d, and (E) 20e, using WRR or CBQ (S206). If a plurality of transmission buffers 151 through 15N are divided by QoS classes as described above, the transmission order of the relative guarantee type packets is controlled with consideration for fairness among the QoS classes. Steps S207 and S208 are the same as steps S107 and S108 shown in FIG. 6.

FIG. 8 illustrates a procedure for the communication method for the case where a plurality of transmission buffers 151 through 15N, for the quantitative guarantee type packets, are divided by mobile stations, and for the relative guarantee type packets, are classified for every QoS class. To begin with, the base station 10 determines whether a packet arrived at the base station 10 from the core network 30 is a quantitative guarantee type packet (S301). If the arrived packet is a quantitative guarantee type packet, the base station 10 stores that packet in a corresponding transmission buffer for every mobile station (A) 20a through (E) 20e according to the destination of that packet (S302). Otherwise, if the arrived packet is a relative guarantee type packet, the base station 10 stores that packet in a corresponding transmission buffer for every QoS class according to the class of that packet (S303). While classifying the arrived packet into either a quantitative guarantee type packet or a relative guarantee type packet, the base station 10 stores it in a corresponding transmission buffer for every mobile station or for every QoS class, by repeating steps S301 through S303 for a few minutes, for the packets in the buffer 15. As a result, the base station 10 may classify the packets and store them in the corresponding transmission buffers.

The base station 10 then gives priority to quantitative guarantee type packets with destinations, which are the mobile stations (A) 20a and (C) 20c, over the relative guarantee type packets with destinations, which are the mobile stations (B) 20b, (D) 20d, and (E) 20e, in the transmission order. The base station 10 then controls the transmission order of the quantitative guarantee type packets with destinations, which are the mobile stations (A) 20a and (C) 20c, using RR or WFQ such that a request value for communication quality can be guaranteed (S304). In this manner, when the transmission buffers for the quantitative guarantee type packets are divided by mobile stations, the transmission order of the quantitative guarantee type packets is controlled with consideration for fairness among the mobile stations. Steps S305 and S306 are the same as steps S104 and S105 shown in FIG. 6.

In step S306, if radio resources remain, the base station 10 controls the transmission order of the relative guarantee type packets with destinations, which are the mobile stations (B) 20b, (D) 20d, and (E) 20e, using WRR or CBQ (S307). In this manner, when the transmission buffers for the relative guarantee type packets are divided by QoS classes, the transmission order of the relative guarantee type packets is controlled with consideration for fairness among the QoS classes. Steps S308 and S309 are the same as steps S107 and S108 shown in FIG. 6.

FIG. 9 illustrates a procedure for the communication method fox the case where a plurality of transmission buffers 151 through 151 for the quantitative guarantee type packets, are divided by QoS classes, and for the relative guarantee type packets, are divided by mobile stations. To begin with, the base station 10 determines whether a packet arrived at the base station 10 from the core network 30 is a quantitative guarantee type packet (S401). If the arrived packet is a quantitative guarantee type packet, the base station 10 stores that packet in a corresponding transmission buffer for every QoS class according to the class of that packet (S402). Otherwise, if the arrived packet is a relative guarantee type packet, the base station 10 stores that packet in a corresponding transmission buffer for every mobile station (B) 20b, (C) 20c and (D) 20d according to the destination of that packet (S403). While classifying the arrived packet into either a quantitative guarantee type packet or a relative guarantee type packet, the base station 10 stores it in a corresponding transmission buffer for every mobile station or for every QoS class, by repeating steps S401 through S403, for a few minutes, for that packet in the buffer 15. As a result, the base station 10 can classify and store the packets in corresponding transmission buffers.

The base station 10 then gives priority to quantitative guarantee type packets with transmission destinations, which are the mobile stations (A) 20a and (C) 20c, over relative guarantee type packets with destinations, which are the mobile stations (B) 20b, (D) 20d, and (E) 20e, in the transmission order. The base station 10 then controls the transmission order of the quantitative guarantee type packets with transmission destinations, which are the mobile stations (A) 20a and (C) 20c, using WRR or CBQ such that a request value for communication quality can be guaranteed (S404). In this manner, when the transmission buffers for the quantitative guarantee type packets are divided by QoS classes, the transmission order of the quantitative guarantee type packets is controlled with consideration for fairness among the QoS classes. Steps S405 and S406 are the same as steps S104 and S105 shown in FIG. 6.

In step S406, if radio resources remain, the base station 10 controls the transmission order of the relative guarantee type packets with destinations, which are the mobile stations (B) 20b, (D) 20d, and (E) 20e, using the Max. C/I method or PF method (S407). In this manner, when the transmission buffers for the relative guarantee type packets are divided by mobile stations, the transmission order of the relative guarantee type packets is controlled based on the radio quality between each mobile station and the base station. Steps S408 and S409 are the same as steps S107 and S108 shown in FIG. 6.

The communication method has a plurality of steps for determining the transmission order of packets such as steps S103 and S106, S203 and S206, S304 and S307, and S404 and S407 shown in FIGS. 6 through 10, and determines the transmission order in each step.

FIG. 10 illustrates a procedure for a radio resource assigning method. The base station 10 calculates the minimum amount of radio resources required to satisfy a request value for a quantitative guarantee type packet (S501). The base station 10 then assigns the calculated amount of radio resources to the quantitative guarantee type packets according to the transmission order (S502).

According to the communication system 1, base station 10, control device 14, and communication method, the packet classification unit 14a classifies packets into either a quantitative guarantee type packet or a relative guarantee type packet. The scheduling unit 14b then controls the transmission orders of the packets for every classified quantitative guarantee type packet and every classified relative guarantee type packet. Therefore, as shown in FIG. 11, when various mobile stations, such as the mobile station (D) 20d not requesting any predetermined QoS requirement or any specific request values for communication quality, the mobile stations (B) 20b and (E) 20e requesting only predetermined QoS, and the mobile stations (A) 20a and (C) 20c requesting a specific request value for communication quality, coexist within the radio communication system 1, the base station 10 may appropriately control packet transmission between the base station 10 and a plurality of mobile stations (A) 20a through (E) 20e, in the case where packets 2 with destinations, which are mobile stations (A) 20a through (E) 20e, have arrived from the core network 30.

As a result, the base station 10 can provide appropriate services for all mobile stations (A) 20a through (E) 20e.

Figure 11:
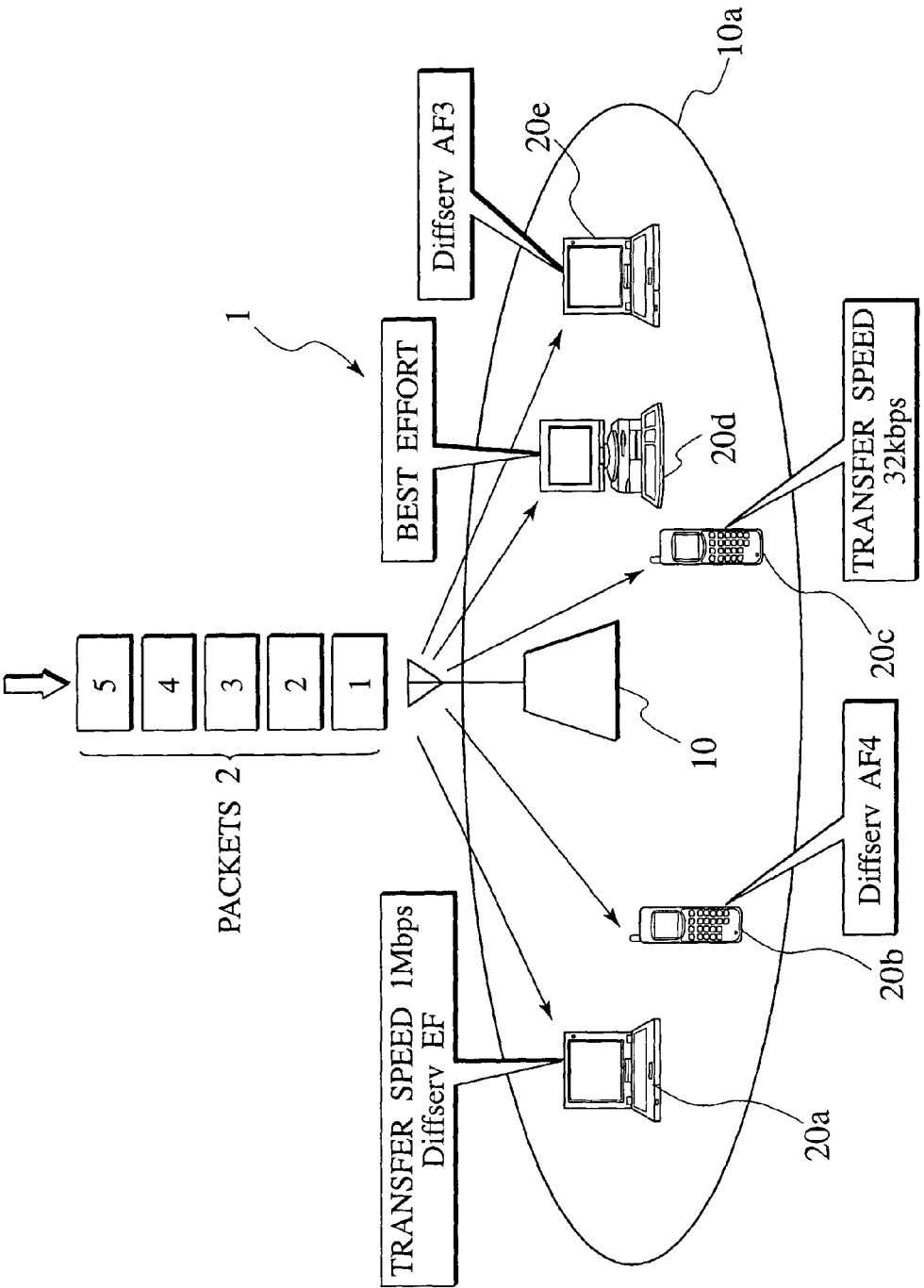
FIG. 11 is a diagram illustrating a situation where various types of mobile stations coexist according to the embodiment of the present invention.

Accordingly, the communication system 1, the base station 10, control device 14, and the communication method according to this embodiment are very effective in classifying the packets and determining the transmission order thereof, under the situation as shown in FIG. 11.

Furthermore, the scheduling unit 14*b* determines the transmission order gives priority to the quantitative guarantee type packets over the relative guarantee type packets. Therefore, the base station 10 transmits the quantitative guarantee type packets at top priority, and can guarantee the request values for communication quality. Moreover, the scheduling unit 14*b* controls the transmission order based on the QoS classes. Therefore, the base station 10 can guarantee QoS of each QoS class.

Furthermore, the scheduling unit 14*b* may control the transmission order based on the radio quality between the base station 10 and a plurality of mobile stations (A) 20*a* through (E) 20*e*. Therefore, the base station 10 can control the transmission order with consideration for radio quality, and can effectively utilize the radio resources. Furthermore, the base station 10 has the radio resource assignment unit 14*c* that assigns radio resources for transmitting a packet to the packet, according to the packet transmission order controlled by the scheduling unit 14*b*. Therefore, the base station 10 can effectively utilize the radio resources according to the transmission order.

MODIFIED EXAMPLES

The present invention is not limited to the above-mentioned embodiment, and various modifications are possible.

Modified Example 1

The scheduling unit 14*b* may function as a measurement unit, which measures the communication quality regarding the requested request value for the quantitative guarantee type packets. The scheduling unit 14*b* compares the request value with the measured value, and controls the transmission order based on the comparison result.

For example, when a request value for an average transfer speed is requested, the scheduling unit 14*b* shown in FIG. 3 then monitors the transmission buffers stored with quantitative guarantee type packets. The scheduling unit 14*b* then measures the rate, which the quantitative guarantee type packets are taken out in a unit time from the transmission buffers stored with quantitative guarantee type packets by the radio resource assignment unit 14*c*, namely, the transmission rate of the quantitative guarantee type packets transmitted from the transmission buffers every specified period. The scheduling unit 14*b* measures this transmission rate as the average transfer speed. For the communication quality regarding the requested request value, a substitution corresponding to the communication quality may be measured, or the communication quality itself may be measured.

The scheduling unit 14*b* then compares the request value for the average transfer speed with the measured transmission rate. If the measured transmission rate does not satisfy the request value for the average transfer speed, the scheduling unit 14*b* controls the transmission order such that the quantitative guarantee type packet with a destination, which is a mobile station, has priority. Otherwise, if the measured transmission rate exceeds the request value for the average transfer speed, the scheduling unit 14*b* controls the transmission order such that the quantitative guarantee type packet with a destination, which is a mobile station, is transmitted later.

Accordingly, the base station 10 may control the transmission order based on the comparison result between the actual measured value and the request value for communication quality. Therefore, the base station 10 can securely guarantee the request value. Furthermore, the base station 10 may prevent the measured value from greatly exceeding the request value for communication quality. As a result, the base station 10 can further appropriately control the packet transmission order. Furthermore, the base station 10 can prevent from utilizing more radio resources for the quantitative guarantee type packet transmission than necessary. Accordingly, the base station 10 may effectively utilize the radio resources, and may save the radio resources for relative guarantee type packet transmission.

Moreover, when the measured value by the scheduling unit 14*b* is more than the request value, the packet classification unit 14*a* should restrain storing the quantitative guarantee type packet in the transmission buffers 151 through 15N. For example, the case where a request value for an average transfer speed is requested is described referencing FIG. 12. To begin with, the scheduling unit 14*b* measures the transmission rate, which the quantitative guarantee type packets are transmitted from the transmission buffers stored with quantitative guarantee type packets, in a unit time. The scheduling unit 14*b* inputs the measured delivery rate to the packet classification unit 14*a* (S601).

The packet classification unit 14*a* compares the transmission rate input from the scheduling unit 14*b* with the request value for the average transfer speed (S602). If the measured transmission rate is more than the request value for the average transfer speed, the packet classification unit 14*a* then discards the quantitative guarantee type packet newly arrived at the base station 10, thereby avoiding storing it in the transmission buffers 151 through 15N. In other words, the packet classification unit 14*a* restrains storing quantitative guarantee type packet in the transmission buffers 151 through 15N (S603).

Accordingly, the actual transfer speed can be controlled so as to prevent it from greatly exceeding the request value for the transfer speed. Note that by providing a temporary buffer in order to store the packet that cannot be stored in the transmission buffers for a specified period, and storing the quantitative guarantee type packet newly arrived at the base station 10 in the temporary buffer, the packet classification unit 14*a* can avoid storing them in the transmission buffer. The packet classification unit 14*a* may take out a packet from the temporary buffer and store it in a corresponding transmission buffer when there are extra radio resources.

Meanwhile, in step S602, when the measured transmission rate is less than or equal to the request value for the average transfer speed, the packet classification unit 14*a* stores the quantitative guarantee type packet newly arrived at the base station 10 in a corresponding transmission buffer 151 through 15N as usual. In this manner, the base station 10 controls the transfer speed. The base station 10 repeats steps S601 through S603 every specified period.

Accordingly, the base station 10 may prevent the measured communication quality from greatly exceeding the request value. Therefore, the base station 10 may prevent the usage of more radio resources for quantitative guarantee type packet transmission than the amount required to guarantee the request value, while guaranteeing the request value for the quantitative guarantee type packets. Accordingly, the base station 10 is capable of guarantee the radio resource for relative guarantee type packet transmission.

Modified Example 2

In the above-mentioned embodiment, the case where the base station 10 transmits a packet to the mobile stations (A)

Figure 13:
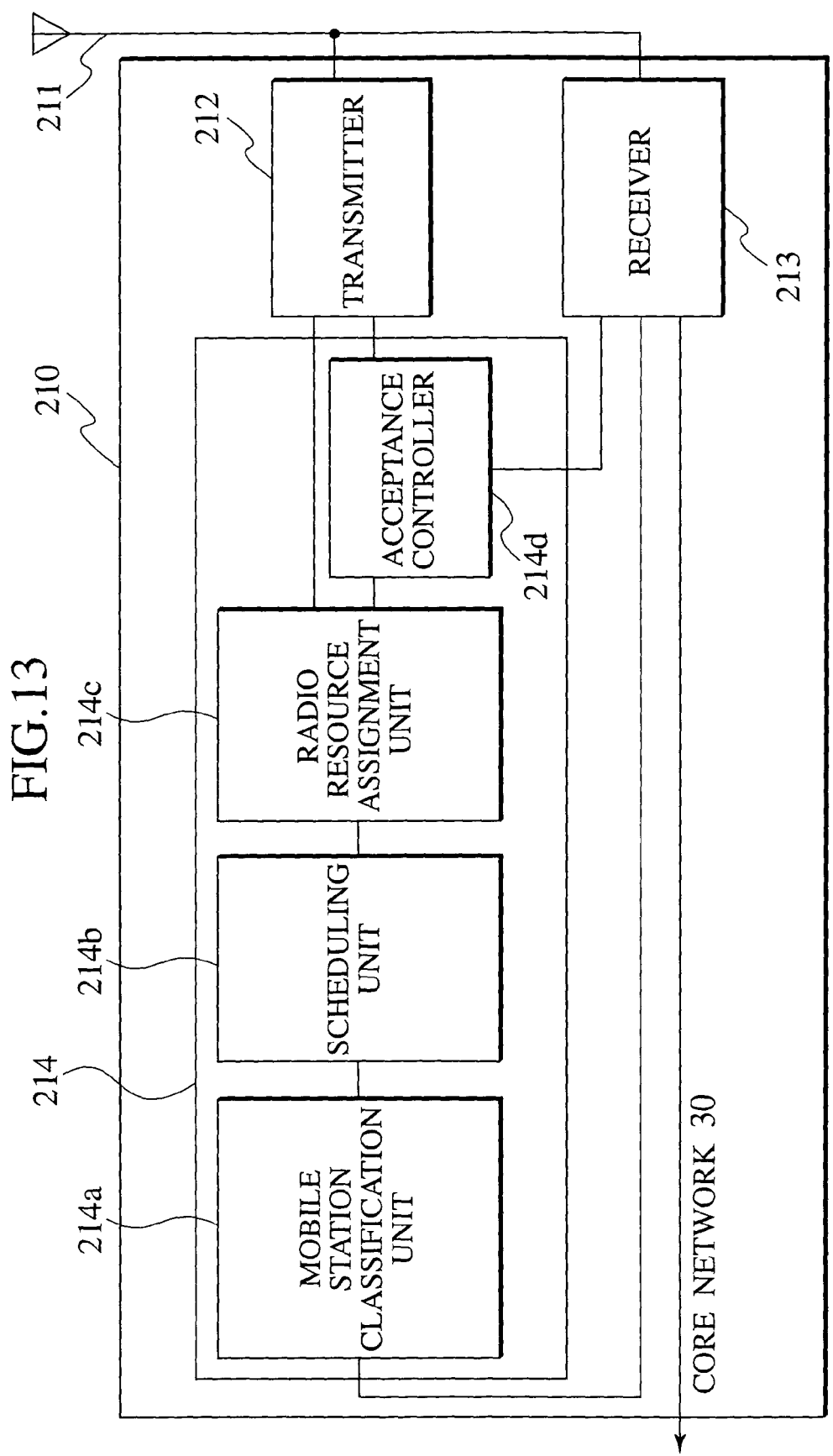
FIG. 13 is a block diagram illustrating a configuration of a base station according to the modified example of the present invention.

20a through (E) 20e through the downlink, and the case where the mobile station (A) 20a receives the packet transmitted from the base station 10 through the downlink have been described using FIGS. 3 and 5. However, the same communication method may be implemented for the case where the base station receives a packet from a mobile station through the uplink, and for the case where a mobile station transmits a packet to the base station through the uplink. In this case, the base station must grasp the QoS class of the mobile station and the request value for communication quality. In addition, the base station must control the timing of transmitting a packet by the mobile station. FIG. 13 illustrates a configuration of a base station 210, which receives a packet from a mobile station through the uplink. FIG. 14 illustrates a configuration of a mobile station 220, which transmits a packet to the base station through the uplink.

As shown in FIG. 13, the base station 210 comprises an antenna 211, a transmitter 212, a receiver 213, and a control device 214. The control device 214 comprises a mobile station classification unit 214a, a scheduling unit 214b, a radio resource assignment unit 214c, and an acceptance controller 214d. Note that the acceptance controller 214d is substantially the same as the acceptance controller 14d shown in FIG. 3. When a packet transmitted to the base station 210 is generated, the mobile station 220 then transmits to the base station 210 QoS information, such as the QoS class for the mobile station and the request value for communication quality, and scheduling information. Therefore, the receiver 212 receives control information such as QoS information and scheduling information transmitted from the mobile station 220 via the antenna 211. Accordingly, the base station 210 may grasp the QoS class for the mobile station and the request value for communication quality. The receiver 212 inputs the received QoS information to the mobile station classification unit 214a, and the received scheduling information to the scheduling unit 214b. The receiver 213 receives the packet transmitted from the mobile station 220 via the antenna 211. The receiver 213 then transmits the received packet to the core network. The receiver 213 also receives a connection request from the mobile station 220. The receiver 213 then inputs the received connection request to the acceptance controller 214d.

The mobile station classification unit 214a classifies the mobile station into either a quantitative guarantee type mobile station or a relative guarantee type mobile station, based on the QoS information input from the receiver 212. The mobile station classification unit 214a further classifies each of the mobile stations that have been classified into either quantitative guarantee type mobile stations or relative guarantee type mobile stations, into a corresponding QoS class. The mobile station classification unit 214a inputs the classification result to the scheduling unit 214b. In this manner, the mobile station classification unit 214a functions as a packet classification unit, which classifies packets transmitted from the mobile station 220 into either a quantitative guarantee type packet or a relative guarantee type packet, by classifying the mobile station 220 into either a quantitative guarantee type mobile station or a relative guarantee type mobile station.

The scheduling unit 214b controls the transmission order of the packets transmitted from the mobile station 220 for every quantitative guarantee type mobile station and every qualitative mobile station, by using the classification result input from the mobile station classification unit 214a and the scheduling information input from the receiver 213. In other words, the scheduling unit 214b determines the transmission order of the packets stored in the transmission buffer of each mobile station 220. Note that the scheduling unit 214b determines the transmission order in the same manner as the scheduling unit 14b shown in FIG. 3. The scheduling unit 214b inputs the determined transmission order of the packet to the radio resource assignment unit 214c. Thus, the scheduling unit 214c controls the transmission order of the packet for every quantitative guarantee type packet and every relative guarantee type packet, by controlling the transmission order of packets transmitted from the mobile station for every quantitative guarantee type mobile station and every relative guarantee type mobile station.

The radio resource assignment unit 214c assigns the radio resource to the packet transmitted from the mobile station 220 according to the transmission order input from the scheduling unit 214b. The base station 210 controls the timing of transmitting the packet from the mobile station 220 in this manner. Note that the radio resource assignment unit 214c assigns radio resources in the same manner as the radio resource assignment unit 14c shown in FIG. 3. The radio resource assignment unit 214c inputs the transmitter 212 the radio resource assignment result.

The transmitter 212 transmits the radio resource assignment result input from the radio resource assignment unit 214c to the mobile station 220. The transmitter 212 also transmits a reply to the connection request from the mobile station, which has been input from the acceptance controller 214d to the mobile station 220.

As shown in FIG. 14, the mobile station 220 comprises an antenna 221, a receiver 222, a control information generation unit 223, a transmitter 224, and a transmission buffer 225. The receiver 222 receives the radio resource assignment result from the base station 10 via the antenna 221. The receiver 222 inputs the received radio resource assignment result to the transmitter 224. Moreover, the receiver 222 receives the reply to the connection request from the base station 210. The transmission buffer 225 stores the packets, which have been generated by the mobile station 220 and are to be transmitted to the base station 210. Each packet is generated when each application is executed in the mobile station 220. The generated packet is immediately stored in the transmission buffer 225.

When a packet is stored in the transmission buffer 225, the control information generation unit 223 creates control information such as QoS information and scheduling information, which are used to transmit that packet. The control information generation unit 223 creates control information in the same manner as the control information generation unit 23 shown in FIG. 5. The control information generation unit 223 inputs the created control information to the transmitter 224. The transmitter 224 transmits the control information input from the control information generation unit 223 to the base station 210 via the antenna 221. The transmitter 224 also transmits to the base station 210 packets in the transmission buffer 225 via the antenna 211. The transmitter 224 takes out those packets from the transmission buffer 225, and sequentially transmits them according to the radio resource assignment result input from the receiver 222. The transmitter 224 also transmits the connection request to the base station 210.

Modified Example 3

The packet classification unit 14a shown in FIG. 3 may function as an attaching unit, which attaches the request value to a packet arrived from the core network 30, based on the QoS class for the packet in the core network 30. In this case, the packet classification unit 14a classifies a packet attached the request value into the quantitative guarantee type packet, and a packet not attached the request value into the relative guarantee type packet.

In the core network 30, it is preferable that at least two or more types of QoS classes are set in the core network 30. The case where two types of QoS classes including a high priority QoS class and a low priority QoS class are set in the core network 30 is described as an example. In the core network 30, an identifier that indicates QoS class is provided to each packet header, and transmission control is performed based on that identifier. The packet classification unit 14a may grasp the QoS class for a packet in the core network 30 from the identifier attached to that packet arrived at the base station 10 from the core network 30.

When the QoS class for an arrived packet is a high priority class, the packet classification unit 14a attaches a request value for communication quality corresponding to the high priority class, as a target value for communication quality, which is used by the base station 10 to perform transmission control, to the arrived packet. Meanwhile, when the QoS class for the arrived packet is a low priority class, the packet classification unit 14a does not attach a request value to the arrived packet. After the packet classification unit 14a has finished attaching the request value, based on the QoS class in the core network 30 in the manner described above, the packet classification unit 14a classifies the packet. The packet classification unit 14a classifies a packet attached the request value into a quantitative guarantee type packet, and a packet not attached the request value into a relative guarantee type packet.

Accordingly, the base station 10 may attach a request value as a target value used by the base station 10 to perform transmission control, based on the QoS class in the core network 30, to the packet arrived from the core network 30. Accordingly, the base station 10 may classify the packet with consideration for the QoS class in the core network 30, and may perform transmission control reflecting the QoS classes in the core network 30. For example, a packet belonging to a high priority class in the core network 30, which has been transmitted with priority and arrived at the base station 10, may be classified into a quantitative guarantee type packet and transmitted with priority. Therefore, the quality of a packet can be maintained overall from the core network 30 to a mobile station.

Moreover, the receiver 213 shown in FIG. 13 may function as a determination unit, which determines a QoS class in the core network 30 for the packet, which has been received from a mobile station and is to be transmitted to the core network 30, based on whether the packet is the quantitative guarantee type packet or the relative guarantee type packet. For example, if the received packet from a mobile station is a quantitative guarantee type packet, the receiver 213 determines the high priority class as being the QoS class in the core network 30 for that packet. The receiver 213 then attaches an identifier indicating the high priority class to the received packet, and transmits the packet to the core network 30. Otherwise, if the received packet from the mobile stations is a relative guarantee type packet, the receiver 213 determines the low priority class as being the QoS class in the core network 30 for the packet. The receiver 213 then attaches an identifier indicating the low priority class to the received packet, and transmits the packet to the core network 30.

Accordingly, the base station 10 may determine the QoS class in the core network 30 for a packet to be transmitted to the core network 30, with consideration for whether the packet is either a quantitative guarantee type packet or a relative guarantee type packet, and transmit it. Therefore, the base station 10 may reflect the result of the packet classification and transmission control performed by the base station 10 to the core network 30. For example, since the packet classified into a quantitative guarantee type packet by the base station 10 and then transmitted with priority can be transmitted with priority even in the core network 30, quality of the packet is maintained overall from the mobile stations to the core network 30.

Modified Example 4

The scheduling unit 14b may determine the transmission order of quantitative guarantee type packets with consideration for the radio quality between the base station 10 and the plurality of mobile stations (A) 20a through (E) 20e, as the relative guarantee type packets. Moreover, the scheduling unit 14b may control the transmission order of the relative guarantee type packets with consideration for the fairness among the mobile stations (A) 20a through (E) 20e, as the quantitative guarantee type packets. There are various QoS classes, such as four classes provided in the third generation mobile communication system (IMT-2000) as shown in FIG. 15, other than the QoS classes shown in FIG. 2.

As described above, the present invention may be used even for the transmission buffers 151 through 15N classified for every mobile station or for every QoS class. Moreover, the present invention may be also used for packet reception/transmission through downlink and through uplink. Furthermore, the present invention may be used not only for a cellular system, but also for other radio communication systems such as a wireless LAN and a fixed radio system.

What is claimed is:

1. A base station comprising:
an attaching unit configured to attach a request value to a packet received from a core network based on a quality of service (QoS) class for the packet in the core network, wherein the attaching includes attaching, to the received packet, a request value for communication quality corresponding to a high priority class as a target value for communication quality used by the base station to perform transmission control when the QoS class for the received packet is a high priority class, and not attaching a request value to the received packet when the QoS class for the received packet is a low priority class;
a packet classification unit configured to classify each packet received/transmitted from/to a plurality of mobile stations into a quantitative guarantee type packet having a request value, which indicates a quantitative value for communication quality, included in the quantitative guarantee type packet or a relative guarantee type packet not having a request value included in or attributed to the relative guarantee type packet when the relative guarantee type packet is received and classified or classified and transmitted, the request value indicating a quantitative value for communication quality;
a quantitative guarantee type buffer configured to store quantitative guarantee type packets received/transmitted from/to the plurality of mobile stations;
a relative guarantee type buffer configured to store relative guarantee type packets received/transmitted from/to the plurality of mobile stations;
a transmission order controller configured to control a transmission order of the packets for every classified quantitative guarantee type packet in the quantitative guarantee type buffer and every classified relative guarantee type packet in the relative guarantee type buffer, the transmission order of each quantitative guarantee type packet in the quantitative guarantee type buffer being based on a corresponding quantitative value and independent of a respective mobile station from/to which the packet is received/transmitted;

a radio resource assignment unit configured to assign radio resources to the quantitative guarantee type packets in the quantitative guarantee type buffer and the relative guarantee type packets in the relative guarantee type buffer, according to the transmission order controlled by the transmission order controller, wherein if radio resources still remain after assignment to the quantitative guarantee type packets in the quantitative guarantee type buffer, the radio resource assignment unit assigns remaining radio resources to the relative guarantee type packets in the relative guarantee type buffer;

a plurality of quantitative guarantee type transmission buffers configured to store quantitative guarantee type packets awaiting transmission; and a measurement unit configured to measure a transmission rate of the quantitative guarantee type packets transmitted from the quantitative guarantee type transmission buffers for each request value for each quantitative guarantee type packet in a unit time by the radio resource assignment unit as an average transfer speed, wherein the transmission order controller compares the request value with the average transfer speed and controls the transmission order based on a result of the comparison, and the packet classification unit restrains storing a quantitative guarantee type packet in one of the plurality of quantitative guarantee type transmission buffers when the average transfer speed is more than a corresponding request value.

2. The base station of claim 1, wherein the transmission order controller gives priority to the quantitative guarantee type packets over the relative guarantee type packets, in the transmission order.

3. The base station of claim 1, wherein the transmission order controller controls the transmission order based on a quality of service class.

4. The base station of claim 1, wherein the transmission order controller controls the transmission order of relative guarantee type packets based on radio quality between the base station and a corresponding one of the plurality of mobile stations.

5. The base station of claim 1, wherein the transmission order controller controls a transmission order of a plurality of quantitative guarantee type packets having the same request value, such that communication quality for the request value becomes the same, among a plurality of mobile stations receiving/transmitting the quantitative guarantee type packets.

6. The base station of claim 1, wherein the transmission order controller controls the transmission order such that a number of the quantitative guarantee type packets transmitted in unit time becomes equal to a number of packets satisfying the request value.

7. The base station of claim 1, wherein the radio resource assignment unit assigns the radio resources to the quantitative guarantee type packets based on the request value.

8. The base station of claim 1,
wherein
the packet classification unit classifies the packet having the request value attached thereto into the quantitative guarantee type packet, and classifies a packet not having a request value attached thereto into the relative guarantee type packet.

9. The base station of claim 1, further comprising:
a determination unit configured to determine a quality of service class in a core network for a packet, which has been received from a mobile station and is to be transmitted to the core network, based on whether the packet is the quantitative guarantee type packet or the relative guarantee type packet.

10. The base station of claim 1, wherein the packet classification unit classifies the packet into a quantitative guarantee type packet having a request value for communication quality that is not a QoS class.

11. The base station of claim 10, wherein the packet classification unit classifies the packets into a quantitative guarantee type packet having a request value for at least one of a specific quantity of at least one of a transfer speed, a transfer delay or jitter.

12. The base station of claim 1, wherein if radio resources still remain after assignment to the relative guarantee type packets, the radio resource assignment unit assigns the further remaining radio resources to the quantitative guarantee type packets further remaining in the quantitative guarantee type buffer.

13. A radio communication system comprising:
a plurality of mobile stations; and
a base station comprising:
an attaching unit configured to attach a request value to a packet received from a core network based on a quality of service (QoS) class for the packet in the core network, wherein the attaching includes attaching, to the received packet, a request value for communication quality corresponding to a high priority class as a target value for communication quality used by the base station to perform transmission control when the QoS class for the received packet is a high priority class, and not attaching a request value to the received packet when the QoS class for the received packet is a low priority class;

a packet classification unit configured to classify each packet received/transmitted from/to the plurality of mobile stations into a quantitative guarantee type packet having a request value, which indicates a quantitative value for communication quality, included in the quantitative guarantee type packet or a relative guarantee type packet not having a request value included in or attributed to the relative guarantee type packet when the relative guarantee type packet is received and classified or classified and transmitted, the request value indicating a quantitative value for communication quality;

a quantitative guarantee type buffer configured to store quantitative guarantee type packets received/transmitted from/to the plurality of mobile stations;

a relative guarantee type buffer configured to store relative guarantee type packets received/transmitted from/to the plurality of mobile stations;

a transmission order controller configured to control a transmission order of the packets for every classified quantitative guarantee type packet in the quantitative guarantee type buffer and every classified relative guarantee type packet in the relative guarantee type buffer, the transmission order of each quantitative guarantee type packet in the quantitative guarantee type buffer being based on a corresponding quantitative value and independent of a respective mobile station from/to which the packet is received/transmitted;

a radio resource assignment unit configured to assign radio resources to the quantitative guarantee type packets in the quantitative guarantee type buffer and the relative guarantee type packets in the relative guarantee type buffer, according to the transmission order controlled by the transmission order controller;

wherein if radio resources still remain after assignment to the quantitative guarantee type packets in the quantitative guarantee type buffer, the radio resource assignment unit assigns remaining radio resources to the relative guarantee type packets in the relative guarantee type buffer;

a plurality of quantitative guarantee type transmission buffers configured to store quantitative guarantee type packets awaiting transmission; and a measurement unit configured to measure a transmission rate of the quantitative guarantee type packets transmitted from the quantitative guarantee type transmission buffers for each request value for each quantitative guarantee type packet in a unit time by the radio resource assignment unit as an average transfer speed, wherein the transmission order controller compares the request value with the average transfer speed and controls the transmission order based on a result of the comparison, and the packet classification unit restrains storing a quantitative guarantee type packet in one of the plurality of quantitative guarantee type transmission buffers when the average transfer speed is more than a corresponding request value.

14. The radio communication system of claim 13, wherein the packet classification unit classifies the packet into a quantitative guarantee type packet having a request value for communication quality that is not a QoS class.

15. The radio communication system of claim 14, wherein the packet classification unit classifies the packets into a quantitative guarantee type packet having a request value for at least one of a specific quantity of at least one of a transfer speed, a transfer delay or jitter.

16. The radio communication system of claim 13, wherein if radio resources still remain after assignment to the relative guarantee type packets, the radio resource assignment unit assigns the further remaining radio resources to the quantitative guarantee type packet further remaining in the quantitative guarantee type buffer.

17. A communication method comprising:

attaching a request value to a packet received from a core network based on a quality of service (QoS) class for the packet in the core network, wherein the attaching includes attaching, to the received packet, a request value for communication quality corresponding to a high priority class as a target value for communication quality used by the base station to perform transmission control when the QoS class for the received packet is a high priority class, and not attaching a request value to the received packet when the QoS class for the received packet is a low priority class;

classifying each packet received/transmitted from/to a plurality of mobile stations into a quantitative guarantee type packet having a request value, which indicates a quantitative value for communication quality, included in the quantitative guarantee type packet or a relative guarantee type packet not having a request value included in or attributed to the relative guarantee type packet when the relative guarantee type packet is received and classified or classified and transmitted, the request value indicating a quantitative value for communication quality;

controlling a transmission order of the packets for every classified quantitative guarantee type packet and every classified relative guarantee type packet by the base station, the transmission order of each quantitative guarantee type packet in the quantitative guarantee type buffer being based on a corresponding quantitative value and independent of a respective mobile station from/to which the packet is received/transmitted;

assigning radio resources to the quantitative guarantee type packet and the relative guarantee type packet, according to the transmission order controlled in the controlling step, wherein if radio resources still remain after assignment to the quantitative guarantee type packets in the quantitative guarantee type buffer, assigning, in the assigning step, remaining radio resources to the relative guarantee type packets in the relative guarantee type buffer;

storing quantitative guarantee type packets awaiting transmission in a plurality of quantitative guarantee type transmission buffers measuring a transmission rate of the quantitative guarantee type packets transmitted from the quantitative guarantee type transmission buffers for each request value for each quantitative guarantee type packet in a unit time by the radio resource assignment unit as an average transfer speed;

comparing the request value with the average transfer speed and controls the transmission order based on a result of the comparison; and restraining from storing a quantitative guarantee type packet in one of the plurality of quantitative guarantee type transmission buffers when the average transfer speed is more than a corresponding request value.

18. The method of claim 17, wherein the classifying comprises classifying a packet into the quantitative guarantee type packet having a request value for communication quality that is not a QoS class.

19. The method of claim 17, wherein if radio resources still remain after assignment to the relative guarantee type packet, assigning the further remaining radio resources to the quantitative guarantee type packet further remaining in the quantitative guarantee type buffer.

* * * * *